US009981659B2

(12) United States Patent
Urano et al.

(10) Patent No.: US 9,981,659 B2
(45) Date of Patent: May 29, 2018

(54) DRIVING ASSIST DEVICE

(71) Applicant: TOYOTA JIDOSHA KABUSHIKI KAISHA, Aichi-ken (JP)

(72) Inventors: Hiromitsu Urano, Numazu (JP); Katsuhiro Sakai, Hadano (JP); Toshiki Kindo, Yokohama (JP); Kentaro Ichikawa, Sunto-gun (JP); Masahiro Harada, Atsugi (JP)

(73) Assignee: TOYOTA JIDOSHA KABUSHIKI KAISHA, Toyota-shi, Aichi (JP)

( * ) Notice: Subject to any disclaimer, the term of this patent is extended or adjusted under 35 U.S.C. 154(b) by 0 days. days.

(21) Appl. No.: 15/716,973

(22) Filed: Sep. 27, 2017

(65) Prior Publication Data

US 2018/0029594 A1 Feb. 1, 2018

Related U.S. Application Data

(63) Continuation of application No. 15/244,511, filed on Aug. 23, 2016, now Pat. No. 9,802,608, which is a
(Continued)

(51) Int. Cl.
| | |
|---|---|
| *G08G 1/16* | (2006.01) |
| *B60W 30/09* | (2012.01) |
| *B60W 50/12* | (2012.01) |
| *G01S 13/86* | (2006.01) |
| *B60Q 9/00* | (2006.01) |

(Continued)

(52) U.S. Cl.
CPC ............ *B60W 30/09* (2013.01); *B60Q 9/008* (2013.01); *B60W 50/12* (2013.01); *G01S 7/412* (2013.01);
(Continued)

(58) Field of Classification Search
CPC . G01S 13/931; G01S 19/42; G08G 1/096716; G08G 1/205; G08G 1/123; B60Q 9/008; B60Q 1/525
(Continued)

(56) References Cited

U.S. PATENT DOCUMENTS 7,102,496 B1 * 9/2006 Ernst, Jr. .......... G08G 1/096725
180/167
7,124,027 B1 * 10/2006 Ernst, Jr. ................ B60W 30/09
340/435
(Continued)

FOREIGN PATENT DOCUMENTS

DE 102006020391 A1 6/2007
JP 2002178864 A 6/2002
(Continued)

*Primary Examiner* — George Bugg
*Assistant Examiner* — Munear Akki
(74) *Attorney, Agent, or Firm* — Sughrue Mion, PLLC

(57) ABSTRACT

Provided is a driving assist device 10 that recognizes an object in the vicinity of a moving body, and assists a driver in driving the moving body, the apparatus including: an object detecting unit 12 that detects the object in the vicinity of the moving body; a three dimensional object detecting unit 13 that detects a three dimensional object in the vicinity of the moving body; and an object recognition unit 18 that recognizes the object at a predetermined detection position as a non-obstacle when the object information storing unit 16 stores the position of the object, and the three dimensional object information storing unit 17 does not store the position of the three dimensional object at the predetermined position in which detection is performed by both of the object detecting unit 12 and the three dimensional object detecting unit 13.

2 Claims, 22 Drawing Sheets

Related U.S. Application Data continuation of application No. 14/399,599, filed as application No. PCT/JP2012/061897 on May 9, 2012, now Pat. No. 9,446,711.

(51) Int. Cl.
*G01S 7/41* (2006.01)
*G06K 9/00* (2006.01)
*G05D 1/02* (2006.01)
*G01S 13/93* (2006.01)

(52) U.S. Cl.
CPC .......... *G01S 13/865* (2013.01); *G01S 13/931* (2013.01); *G05D 1/0231* (2013.01); *G06K 9/00805* (2013.01); *G08G 1/165* (2013.01); *G08G 1/166* (2013.01); *B60W 2420/42* (2013.01); *B60W 2420/52* (2013.01); *B60W 2550/10* (2013.01); *B60W 2710/20* (2013.01); *B60W 2720/106* (2013.01); *B60W 2750/306* (2013.01); *B60W 2750/308* (2013.01)

(58) Field of Classification Search
USPC ............... 340/901, 605, 988, 996, 436, 435; 701/301, 469
See application file for complete search history.

(56) References Cited

U.S. PATENT DOCUMENTS

| | | |
|---|---|---|
| 7,809,503 B2 | 10/2010 | Nakamura et al. |
| 2001/0020217 A1 | 9/2001 | Matsuno |
| 2003/0011509 A1 | 1/2003 | Honda |
| 2008/0042894 A1 | 2/2008 | Kikuchi |
| 2008/0266167 A1 | 10/2008 | Baumann et al. |
| 2009/0207168 A1 | 8/2009 | Hattori |
| 2010/0215220 A1 | 8/2010 | Yamaguchi et al. |
| 2011/0010020 A1 | 1/2011 | Samukawa |
| 2013/0093614 A1 | 4/2013 | Tokoro |
| 2014/0229069 A1 | 8/2014 | Akiyama |
| 2014/0341432 A1* | 11/2014 | Ichida ................... G08G 1/165 382/103 |

FOREIGN PATENT DOCUMENTS

| | | |
|---|---|---|
| JP | 2008040646 A | 2/2008 |
| JP | 2010169275 A | 7/2010 |
| JP | 2011-018214 A1 | 1/2011 |
| JP | 2011-253241 A | 12/2011 |
| WO | 2011158292 A1 | 12/2011 |

* cited by examiner

Fig.2
(a)
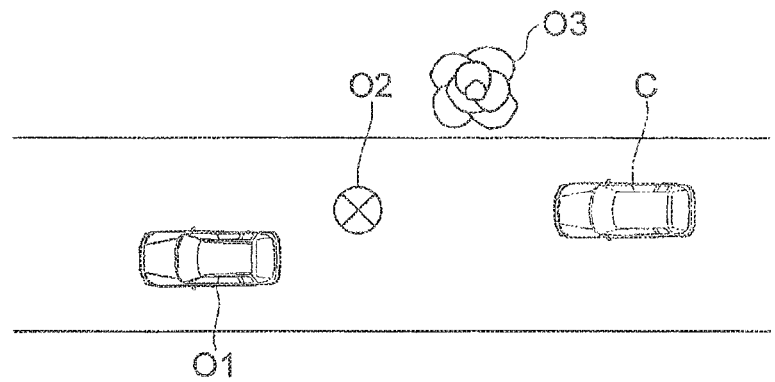
(b)
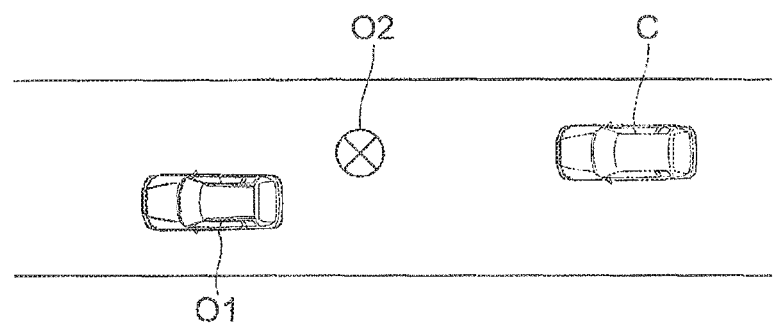
(c)
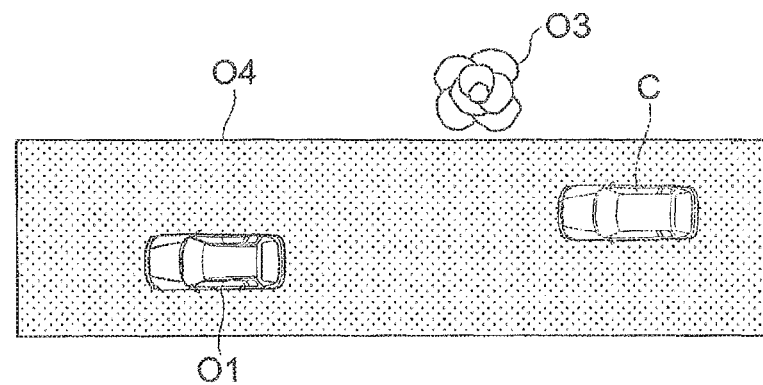

Fig.3
(a)
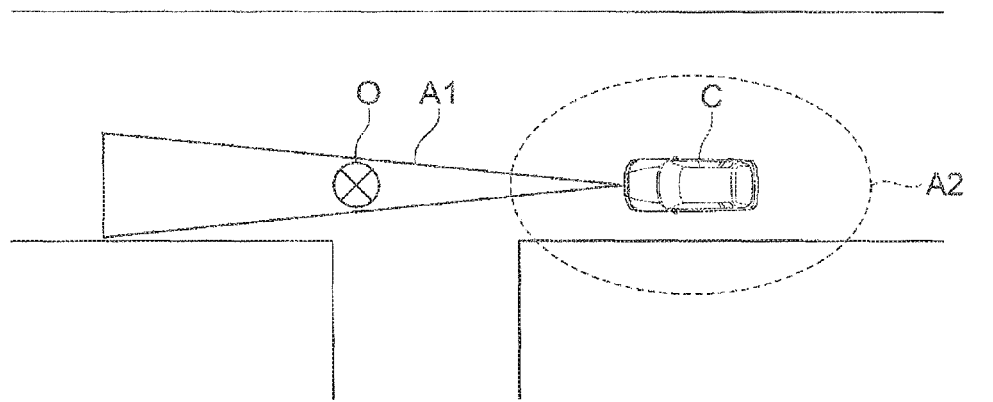
(b)
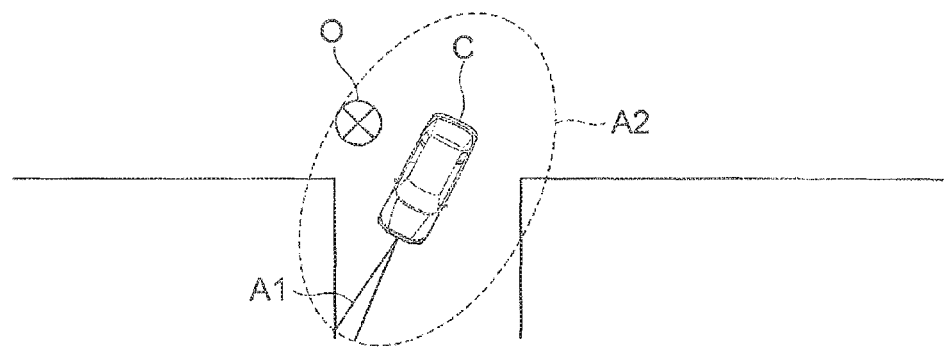

*Fig.7*
(a)
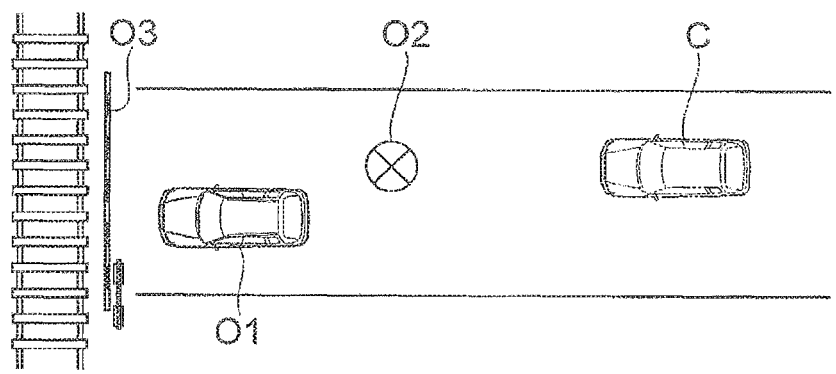
(b)
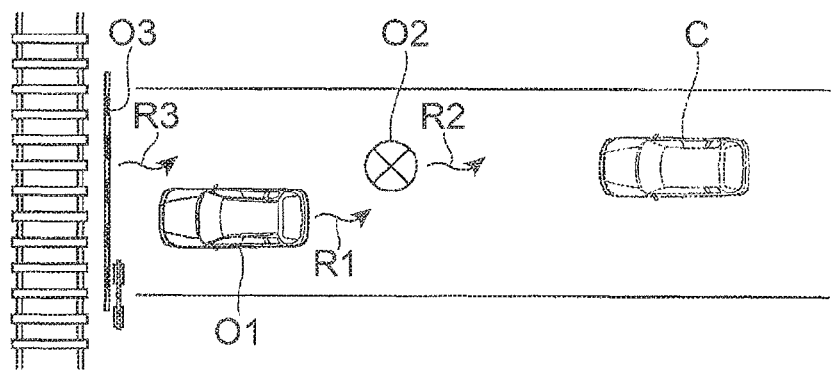
(c)
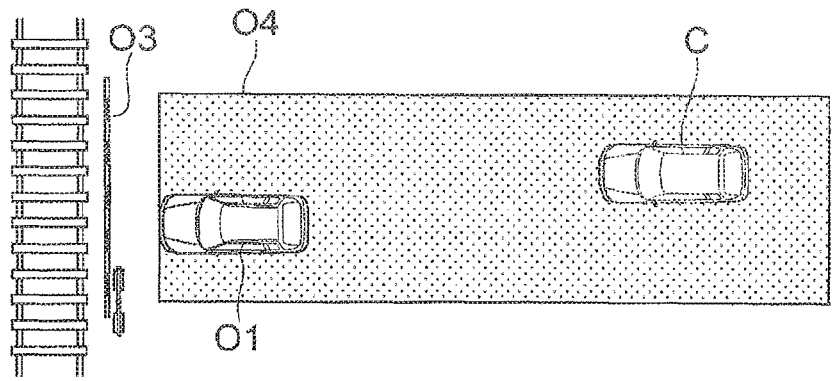

(a)

Fig.14
(a)
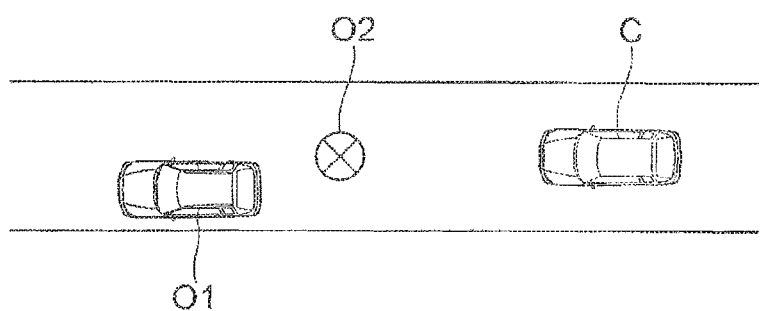
(b)
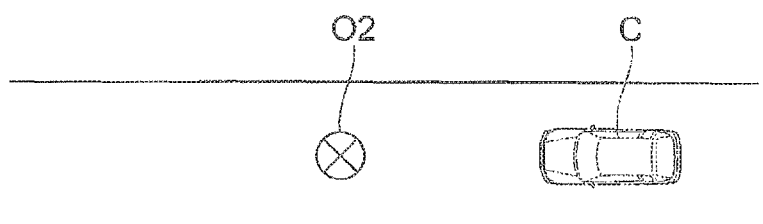

Fig.17
(a)
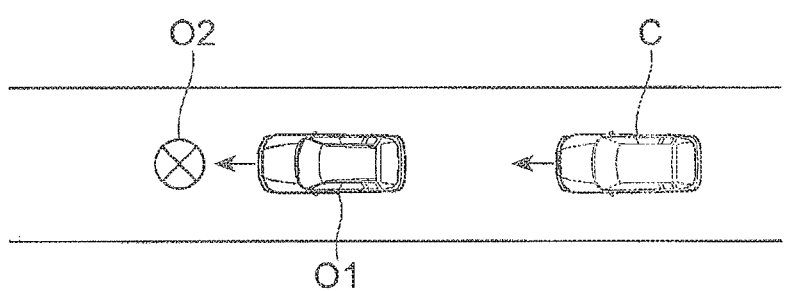
(b)
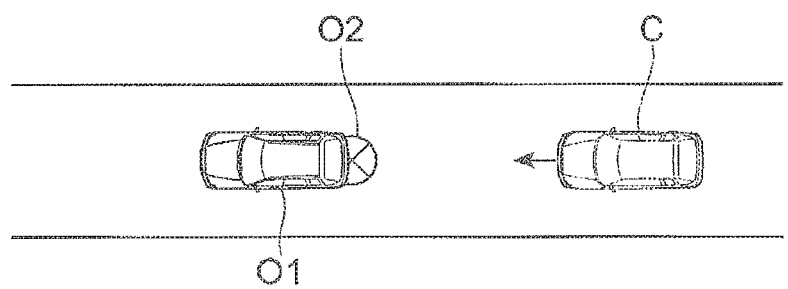

Fig.20
(a)
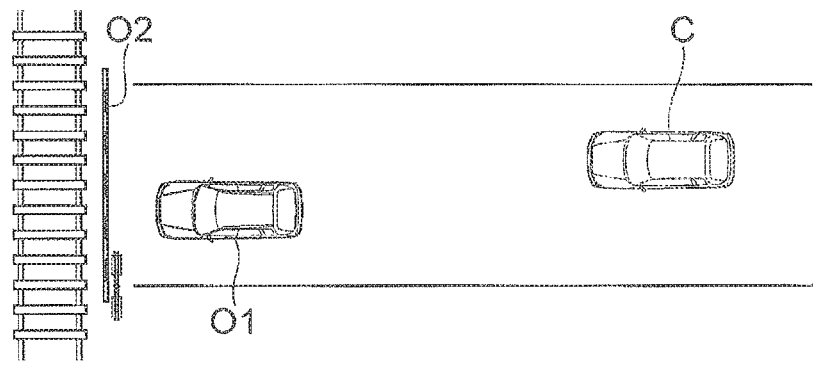
(b)
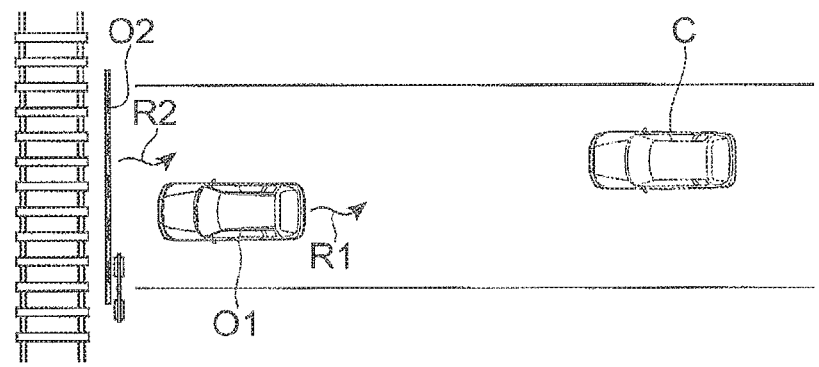
(c)
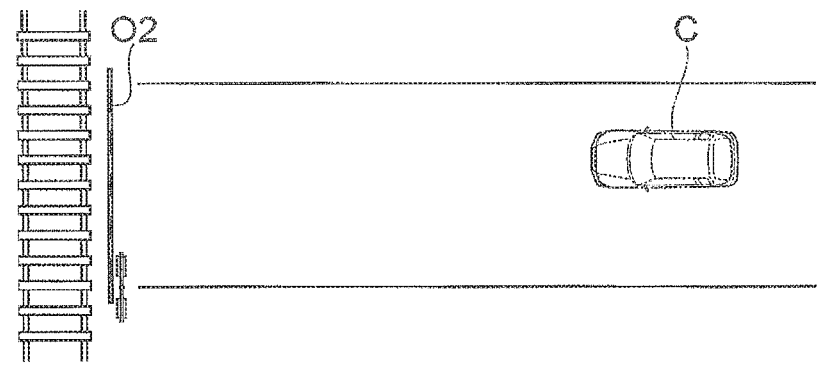

DRIVING ASSIST DEVICE

CROSS-REFERENCE TO RELATED APPLICATIONS

This is a continuation of U.S. patent application Ser. No. 15/244,511, filed Aug. 23, 2016 (allowed), which is a continuation of U.S. patent application Ser. No. 14/399,599, filed Dec. 2, 2014, issued as U.S. Pat. No. 9,446,711, which is a National Stage entry of International Application No. PCT/JP2012/061897, filed May 9, 2012. The entire disclosures of the prior applications are considered part of the disclosure of the accompanying continuation application, and are hereby incorporated by reference.

TECHNICAL FIELD

The present invention relates to a driving assist device that assists a driver in driving a moving body.

BACKGROUND ART

The related art discloses a driving assist device that recognizes an object in the vicinity of a moving body such as a vehicle, a ship, or an airplane, and assists a driver in driving the moving body. There exist various fixed objects in the vicinity of the moving body. The fixed object can be divided into a non-obstacle that is not an obstacle to the movement of the moving body, and an obstacle to the movement of the moving body. For this reason, it is important to properly recognize a non-obstacle and an obstacle.

However, in practice, the vehicle as an example of the moving body may recognize a non-obstacle, for example, a manhole or a reflective plate as being an obstacle. For this reason, Japanese Unexamined Patent Application Publication No. 2011-18214 discloses a technology by which a non-obstacle is recognized as being a non-obstacle based on moving information of a preceding vehicle. However, according to this technology, it is not possible to recognize a non-obstacle as being a non-obstacle at all in a situation where there exist no preceding vehicles. As a result, a non-obstacle may be recognized as being an obstacle, and thus drive assistance may be given to cause discomfort to an occupant.

In addition, it may not be possible to recognize an obstacle such as a crossing gate, a metallic net, or a wooden fence, which does not sufficiently reflect a detective wave for detecting an object, as being an obstacle. As a result, it is not possible to recognize an obstacle as being an obstacle, and thus drive assistance may be given to cause discomfort to an occupant.

CITATION LIST

Patent Literature

[Patent Literature 1] Japanese Unexamined Patent Application Publication No. 2011-18214

SUMMARY OF INVENTION

Technical Problem

For this reason, an object of the present invention is to provide a driving assist device that can properly recognize an object in the vicinity of a moving body so as to assist a driver in driving the moving body.

Solution to Problem

According to an aspect of the present invention, there is provided a driving assist device that recognizes an object in the vicinity of a moving body, and assists a driver in driving the moving body, the apparatus including; an object detecting unit that detects the object in the vicinity of the moving body; a three dimensional object detecting unit that detects a three dimensional object in the vicinity of the moving body; a first storage unit that stores the position of the object detected by the object detecting unit; a second storage unit that stores the position of a three dimensional object detected by the three dimensional object detecting unit; and an object recognition unit that recognizes the object at a predetermined detection position as a non-obstacle when the first storage unit stores the position of the object, and the second storage unit does not store the position of the three dimensional object at the predetermined position in which detection is performed by both of the object detecting unit and the three dimensional object detecting unit. Accordingly, the object, which is detected as an object but is not detected as a three dimensional object, is recognized as a non-obstacle based on the current and past positions of each of the object and the three dimensional object. Accordingly, the non-obstacle unlikely to be detected as a three dimensional object can be prevented from being erroneously recognized as an obstacle.

When the three dimensional object detecting unit does not detect the three dimensional object at the position of the object stored in the first storage unit, the object recognition unit may recognize the object detected by the object detecting unit as a non-obstacle. Accordingly, since the position of the object is stored, it is possible to properly recognize a non-obstacle even when the three dimensional object is not detected concurrently with the object.

When the position of the object detected by the object detecting unit is not stored as the position of the three dimensional object by the second storage unit, the object recognition unit may recognize the object detected by the object detecting unit as a non-obstacle. Accordingly, since the position of the object is stored, it is possible to properly recognize a non-obstacle even when the object is not detected concurrently with the three dimensional object.

In the respective detectable ranges of the object detecting unit and the three dimensional object detecting unit, with regard to at least a detectable range in a forward direction of the moving body, a position farthest from the moving body which is detectable by the object detecting unit may be set to be located with respect to the moving body farther than a position farthest from the moving body which is detectable by the three dimensional object detecting unit. Accordingly, for example, when it takes greater time for the three dimensional object detecting unit to scan the vicinity of the vehicle with a laser beam in three dimensions than the time it takes for the object detecting unit to scan the vicinity of the vehicle therewith in two dimensions, it is possible to absorb a difference between the scanning times by setting the detection range of the object detecting unit to a large range.

The object recognition unit may compare the position of the object with the position of the three dimensional object in a detection range having a narrow detection range or a short detection distance between the detection range of the object detecting unit and the detection range of the three dimensional object detecting unit. Accordingly, since the position of the object is compared with the position of the three dimensional object in the detection range that has a narrow detection range or a short detection distance, the comparison between the positions is efficiently performed.

When the three dimensional object detecting unit detects the three dimensional object at a position in which the object is detected by the object detecting unit, and the intensity of a reflective wave from the object detected by the object detecting unit is less than a set threshold value, the object recognition unit may recognize the object detected by the object detecting unit as an obstacle. Accordingly, since the object having a reflective wave intensity of less than the set threshold value is recognized as an obstacle, it is possible to properly recognize the obstacle that has a relatively weak reflective wave intensity.

According to another aspect of the present invention, provided is a driving assist device that recognizes an object in the vicinity of a moving body, and assists a driver in driving the moving body, the apparatus including: an object detecting unit that detects the object in the vicinity of the moving body; a storage unit that stores the position of a fixed object in the vicinity of the moving body; and an object recognition unit that recognizes the object detected by the object detecting unit as a non-obstacle when the position of the object detected by the object detecting unit is stored as the position of the non-obstacle by the storage unit. Accordingly, the object stored as a non-obstacle is recognized as a non-obstacle. Accordingly, it is possible to prevent a non-obstacle from being erroneously recognized as an obstacle.

When the position of the object detected by the object detecting unit is stored as the position of the non-obstacle by the storage unit, but the object detected by the object detecting unit is a moving object, the object recognition unit may not recognize the object detected by the object detecting unit as a non-obstacle. Accordingly, since a moving body is not recognized as a non-obstacle, a preceding vehicle or the like temporarily stopped at the position of the non-obstacle can be prevented from being recognized as a non-obstacle.

The object detecting unit may be a radar sensor. When the position of the object detected by the object detecting unit is stored as the position of an obstacle by the storage unit, and the intensity of a reflective wave from the object detected by the object detecting unit is a set threshold value or greater, the object recognition unit may recognize the object detected by the object detecting unit as an obstacle. Accordingly, since the object having a reflective wave intensity of the set threshold value or greater is recognized as an obstacle, it is possible to properly recognize the obstacle that has a relatively weak reflective wave intensity.

When the object detecting unit does not detect the object at the position of the fixed object stored in the storage unit, or when the object detecting unit detects the object at the position of the fixed object not stored in the storage unit, the object recognition unit may update the position of the fixed object. Accordingly, since the position of the fixed object is updated, it is possible to properly recognize the object based on the latest information.

Advantageous Effects of Invention

According to the present invention, it is possible to provide a driving assist device that can properly recognize an object in the vicinity of a moving body so as to assist a driver in driving the moving body.

BRIEF DESCRIPTION OF DRAWINGS

FIG. 2 shows schematic views illustrating the respective detected results of an object detecting unit and a three dimensional object detecting unit, with the detected results compared with each other.

FIG. 3 shows schematic views illustrating the respective detection ranges of the object detecting unit and the three dimensional object detecting unit with the detection ranges compared with each other.

FIG. 7 shows schematic views illustrating the respective detected results of the object detecting unit and the three dimensional object detecting unit, with the detected results compared with each other.

FIG. 14 shows schematic views illustrating a detected result of an object detecting unit and fixed object information, with the detected result and the fixed object information compared with each other.

FIG. 17 shows schematic views illustrating results of detecting the object.

FIG. 20 shows schematic views illustrating a detected result of an object detecting unit and the fixed object information, with the detected result and the fixed object information compared with each other.

DESCRIPTION OF EMBODIMENTS

Hereinafter, embodiments of the present invention will be described with reference to the accompanying drawings. In the description of the drawings, the same reference signs will be assigned to the same elements, and duplicated descriptions will be omitted.

Hereinafter, a first embodiment and a second embodiment of the present invention will be described together with the respective modification examples thereof. In the first embodiment and the modification example, an object is properly recognized based on the detected result of a three dimensional object so as to assist a driver in driving a moving body. In contrast, in the second embodiment and the modification example, the object is properly recognized based on fixed object information of a fixed object so as to assist the driver in driving the moving body. In the following description, a driving assist device according to the present invention is applied to a vehicle, however, similarly, the driving assist device according to the present invention can applied to a moving body such as a ship, an airplane, or the like.

Hereinafter, a driving assist device 10 according to the first embodiment will be described with reference to FIGS. 1 to 4. The driving assist device 10 according to the first embodiment properly recognizes a non-obstacle based on a result of detecting an object and a result of detecting a three dimensional object in the vicinity of a vehicle. Here, the non-obstacle represents the fixed objects such as a manhole and a reflective plate which are not an obstacle to the movement of the vehicle.

Figure 1:
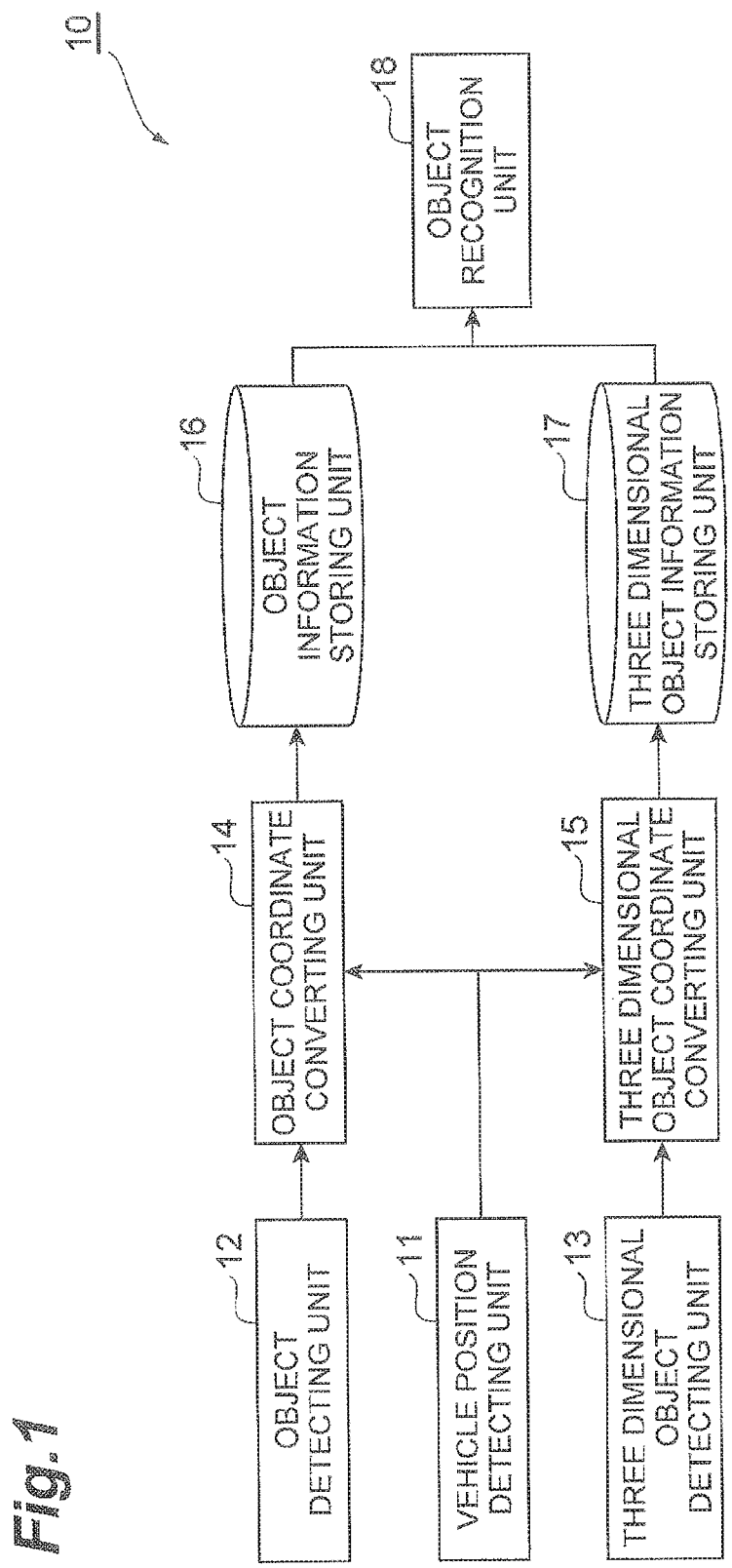
FIG. 1 is a block diagram illustrating the configuration of a driving assist device according to a first embodiment.

First, the configuration of the driving assist device 10 according to the first embodiment will be described with reference to FIG. 1. FIG. 1 is a block diagram illustrating the configuration of the driving assist device 10 according to the first embodiment. As illustrated in FIG. 1, the driving assist device 10 includes a vehicle position detecting unit 11; an object detecting unit 12; a three dimensional object detecting unit 13; an object coordinate converting unit 14; a three dimensional object coordinate converting unit 15; an object information storing unit 16 (first storage unit); a three dimensional object information storing unit 17 (second storage unit); and an object recognition unit 18.

An electronic control unit (ECU) or the like mounted in the vehicle realizes at least a part of the functions of the driving assist device 10, particularly, the function of each of the object coordinate converting unit 14, the three dimensional object coordinate converting unit 15, the object information storing unit 16, the three dimensional object information storing unit 17, and the object recognition unit 18. The ECU includes a CPU, a ROM, a RAM, and the like, and the CPU executes a program stored in the ROM or the like on the RAM. The object coordinate converting unit 14; the three dimensional object coordinate converting unit 15; the object information storing unit 16; and the three dimensional object information storing unit 17 may be integrally formed.

The vehicle position detecting unit 11 detects the position of the vehicle. For example, the vehicle position detecting unit 11 is a GPS sensor. The position of the vehicle is detected based on a detection value of the sensor. The current position is expressed in a global coordinate system, that is, by latitude and longitude.

The object detecting unit 12 detects the position of the object in the vicinity of the vehicle. For example, the object detecting unit 12 is a radar sensor, and preferably a millimeter-wave radar sensor. The position of the object is detected based on a detection value of the sensor. The object detecting unit 12 detects the position of the object and the speed of the object relative to the vehicle by transmitting a radio wave to the vicinity of the vehicle, particularly, forward of the vehicle, and receiving a reflected wave. The position of the object is expressed in an inherent local coordinate system of the sensor, that is, by the distance and angle of the object relative to the vehicle. The object detecting unit 12 cannot specify whether the detected object is a three dimensional object or a two dimensional object.

The three dimensional object detecting unit 13 detects the position of the three dimensional object in the vicinity of the vehicle. For example, the three dimensional object detecting unit 13 is a laser radar sensor, however, may be other sensors such as a stereo camera. The position of the three dimensional object is detected based on a detection value of the sensor. The three dimensional object detecting unit 13 detects a three dimensional structure in the vicinity of the vehicle by emitting a laser beam in order for the vicinity of the vehicle to be scanned therewith, and receiving reflected light. In addition, the three dimensional object detecting unit 13 specifies whether the detected object is the three dimensional object or the two dimensional object, based on the detected result of the three dimensional structure, separates the three dimensional object from a ground plane, and detects the position thereof. The position of the three dimensional object is expressed in an inherent local coordinate system of the sensor, that is, is expressed by the distance and angle of the three dimensional object relative to the vehicle. The three dimensional object detecting unit 13 may be formed by a portion that detects the three dimensional structure of the three dimensional object, and a portion that is a separate body, and detects the position of the three dimensional object.

The object coordinate converting unit 14 converts the position of the object expressed in the local coordinate system into a position expressed in the global coordinate system. The position in the local coordinate system supplied from the object detecting unit 12 is converted into a position in the global coordinate system based on the position of the vehicle supplied from the vehicle position detecting unit 11. The position of the object is converted by taking into account not only the position of the vehicle but also the moving direction of the vehicle obtained from a change in the position of the vehicle.

The three dimensional object coordinate converting unit 15 converts the position of the three dimensional object expressed in the local coordinate system into the position expressed in the global coordinate system. The position in the local coordinate system supplied from the three dimensional object detecting unit 13 is converted into a position in the global coordinate system based on the position of the vehicle supplied from the vehicle position detecting unit 11. The position of the three dimensional object is converted by taking account of not only the position of the vehicle but also the moving direction of the vehicle obtained from a change in the position of the vehicle.

The object information storing unit 16 stores information of the object detected by the object detecting unit 12, particularly, the position (position information) of the object as object information. The object coordinate converting unit 14 supplies the position of the object as a position in the global coordinate system. The object information storing unit 16 can store object information of a plurality of objects.

The three dimensional object information storing unit 17 stores the position (position information) of the three dimensional object as three dimensional object information, in which the position is detected by the three dimensional object detecting unit 13. The three dimensional object coordinate converting unit 15 supplies the position of the three dimensional object as a position in the global coordinate system. The three dimensional object information storing unit 17 can store three dimensional object information of a plurality of three dimensional objects.

The object recognition unit 18 recognizes a non-obstacle by comparing the position of the object with the position of the three dimensional object, which will be described later. When the three dimensional object detecting unit 13 does not detect the three dimensional object at a position in which the object is detected by the object detecting unit 12, the object recognition unit 18 recognizes the object as a non-obstacle. When the object information storing unit 16 stores the position information of the object, and the three dimensional object information storing unit 17 does not store the position information of the three dimensional object, particularly at a predetermined detection position in which detection is performed by both of the object detecting unit 12 and the three dimensional object detecting unit 13, the object recognition unit 18 recognizes the object at the predetermined detection position as a non-obstacle.

Here, in the first embodiment, it is assumed that the position of the object and the position of the three dimensional object are respectively stored as the object information and the three dimensional object information, and the positions are compared with each other based on the object information and the three dimensional object information. Accordingly, in regard to detecting the position of the same object, it is not necessarily required to concurrently detect the positions thereof as an object and a three dimensional object.

However, the positions may be compared with each other by another method. That is, it is assumed that in regard to detecting the same object, the positions thereof as an object and a three dimensional object are concurrently detected, however, the object information and the three dimensional object information are not used, and the positions may be compared with each other based on a result of detecting the object and a result of detecting the three dimensional object. In this case, the driving assist device 10 may not include the object information storing unit 16 and the three dimensional object information storing unit 17. In addition, the positions may be compared with each other based on the object information and the detected result of the three dimensional object. In this case, the driving assist device 10 may not include the three dimensional object information storing unit 17. Alternatively, the positions may be compared with each other based on the three dimensional object information and the detected result of the object. In this case, the driving assist device 10 may not include the object information storing unit 16.

In regard to detecting the same object, errors between the positions thereof detected as an object and a three dimensional object are assumed to occur slightly in response to the respective detected position results of the vehicle, the object, and the three dimensional object. For this reason, if the errors are present within a pre-set allowable range, it is preferably determined that the position thereof as an object coincides with the position thereof as a three dimensional object.

Subsequently, the operation of the driving assist device 10 according to the first embodiment will be described with reference to FIGS. 2 to 4. FIG. 2 shows schematic views illustrating the respective detected results of the object detecting unit 12 and the three dimensional object detecting unit 13, with the detected results compared with each other. As illustrated in FIG. 2, the detected results of the object detecting unit 12 and the three dimensional object detecting unit 13 are different from each other in response to a difference between the respective detecting characteristics thereof. FIG. 2(a) illustrates an example of the circumstances of the vicinity of the vehicle. As illustrated in FIG. 2(a), a preceding vehicle O1, a manhole O2, and a standing tree O3 exist in the vicinity of a travelling road of a vehicle C.

FIG. 2(b) illustrates a detected result of the object detecting unit 12 under the circumstances illustrated in FIG. 2(a). The object detecting unit 12 such as a millimeter-wave radar sensor detects the objects. Accordingly, as illustrated in FIG. 2(b), each of the objects that have a strong reflective wave intensity, that is, the preceding vehicle O1 and the manhole O2 are detected. In contrast, each of the objects that have a weak reflective wave intensity, that is, the standing tree O3 and a road surface O4 are not detected.

FIG. 2(c) illustrates a detected result of the three dimensional object detecting unit 13 under the circumstances illustrated in FIG. 2(a). The three dimensional object detecting unit 13 such as a laser radar sensor detects the three dimensional objects. Accordingly, as illustrated in FIG. 2(c), each of the objects that have a three dimensional structure, that is, the preceding vehicle O1, the standing tree O3, and the road surface O4 are detected. In contrast, it is difficult to separate the manhole O2 having a two dimensional structure from the road surface O4, and the manhole O2 is not detected. That is, each of the objects such as a manhole and a reflective plate among the objects on the road surface O4 has almost no height from the road surface O4 and is not an obstacle for normal travelling of a vehicle, and is not detected.

For this reason, in the first embodiment, it is possible to recognize a non-obstacle based on the difference between the respective detecting characteristics of the object detecting unit 12 and the three dimensional object detecting unit 13. That is, it is possible to recognize the object (the manhole 2 in the example illustrated in FIG. 2) as a non-obstacle, in which the object is detected as an object but is not detected as a three dimensional object.

FIG. 3 shows schematic views illustrating the respective detection ranges A1 and A2 of the object detecting unit 12 and the three dimensional object detecting unit 13 with the detection ranges A1 and A2 compared with each other. As illustrated in FIG. 3, the respective detection ranges A1 and A2 of the object detecting unit 12 and the three dimensional object detecting unit 13 are different from each other in response to a difference between the detecting characteristics. For this reason, when recognizing the object, the respective detection ranges A1 and A2 of the object detecting unit 12 and the three dimensional object detecting unit 13 are taken into consideration.

For example, the object detecting unit 12 is a radar sensor, and preferably a millimeter-wave radar sensor, and has the detection range A1 of several hundreds of meters. In contrast, for example, the three dimensional object detecting unit 13 is a laser radar sensor, and has the detection range A2 of several tens of meters. Each of the detection ranges A1 and A2 is not limited to a travelling lane of the vehicle, and also reaches an opposite lane or the vicinity of the travelling road.

Here, in the example illustrated in FIG. 3, a manhole O exists in the vicinity of the intersection of a road. As illustrated in FIG. 3(a), when the vehicle C approaches the intersection at a time t1, the manhole O exists within the detection range A1 of the object detecting unit 12, however, does not exist within the detection range A2 of the three dimensional object detecting unit 13. In addition, as illustrated in FIG. 3(b), when the vehicle C enters the intersection at a time t2, the manhole O does not exist within the detection range A1 of the object detecting unit 12, however, exists within the detection range A2 of the three dimensional object detecting unit 13. That is, the same object does not concurrently exist within the respective detection ranges of the object detecting unit 12 and the three dimensional object detecting unit 13.

As such, since the respective detecting characteristics of the object detecting unit 12 and the three dimensional object detecting unit 13 are different from each other, the same object may not concurrently exist within both of the detection ranges. At this time, it is not possible to concurrently detect the same object as both an object and a three dimensional object. For this reason, in the first embodiment, the respective detected results of the object detecting unit 12 and the three dimensional object detecting unit 13 are stored.

That is, in the example illustrated in FIG. 3, the position of the manhole O existing within the detection range A1 of the object detecting unit 12 is stored as the object information at the time t1. At the time t2, the manhole O is assumed to exist within the detection range A2 of the three dimensional object detecting unit 13 based on the object information that is stored at the time t1. However, in practice, it is difficult to separate the manhole O from the road surface O4, and is not detected as a three dimensional object. Accordingly, the manhole O is recognized as a non-obstacle, that is, the object that is detected (was detected) as an object but is not detected as a three dimensional object. Accordingly, it is possible to recognize the object (the manhole O in the example illustrated in FIG. 3) as a non-obstacle, which does not currently exist within both the detection ranges A1 and A2.

Figure 4:
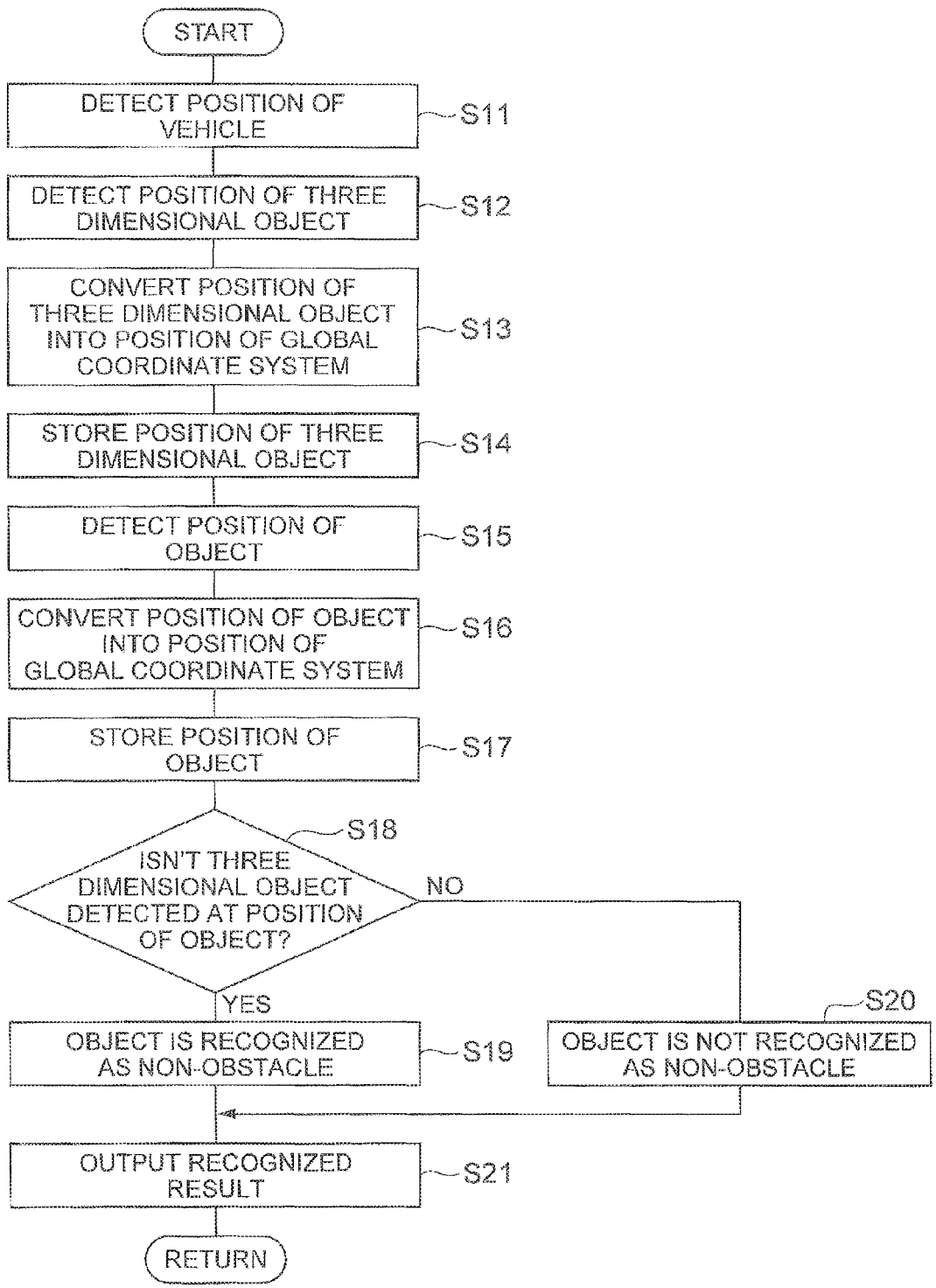
FIG. 4 is a flowchart illustrating the operation of the driving assist device according to the first embodiment.

FIG. 4 is a flowchart illustrating the operation of the driving assist device 10 according to the first embodiment. The driving assist device 10 repeatedly executes a process illustrated in FIG. 4 at each predetermined interval. Step S11, steps S12 to S14, and steps S15 to S17 which will be described below may be executed in a reversed sequence regardless of the above-mentioned sequence.

As illustrated in FIG. 4, the vehicle position detecting unit 11 detects the position of the vehicle in the global coordinate system (step S11). The three dimensional object detecting unit 13 detects the position of the three dimensional object in the vicinity of the vehicle in the local coordinate system (S12). The three dimensional object coordinate converting unit 15 converts the position of the three dimensional object into a position in the global coordinate system (S13). The three dimensional object information storing unit 17 stores the position of the three dimensional object in the global coordinate system (S14). The object detecting unit 12 detects the position of the object in the vicinity of the vehicle in the local coordinate system (S15). The object coordinate converting unit 14 converts the position of the object into a position in the global coordinate system (S16). The object information storing unit 16 stores the position of the object in the global coordinate system (S17).

The object recognition unit 18 determines whether the three dimensional object is not detected at the position of the object using the object information and the three dimensional object information (S18). For example, this determination may be made whenever the position of the object is detected, or at each predetermined interval. When it is determined that the three dimensional object is not detected at the position of the object, the object is detected as an object, however, is not detected as a three dimensional object. Accordingly, the object recognition unit 18 recognizes the object as a non-obstacle (S19).

In contrast, when it is not determined that the three dimensional object is not detected at the position of the object at step S18, the object recognition unit 18 does not recognize the object as a non-obstacle (S20). Subsequent to step S19 or S20, the object recognition unit 18 outputs the recognized result for the next process (S21). The recognized result is used indirectly or directly to assist the driver in driving the vehicle, for example, for the acceleration and deceleration control or the steering control of the vehicle, while being stored as the object information.

As described above, it is possible for the driving assist device 10 according to the first embodiment to properly recognize a non-obstacle based on a result of detecting the object and a result of detecting the three dimensional object in the vicinity of the vehicle. That is, since the object is recognized as a non-obstacle based on the current and past positions of each of the object and the three dimensional object, in which the object is detected as an object but is not detected as a three dimensional object, the non-obstacle unlikely to be detected as a three dimensional object can be prevented from being erroneously recognized as an obstacle.

Figure 5:
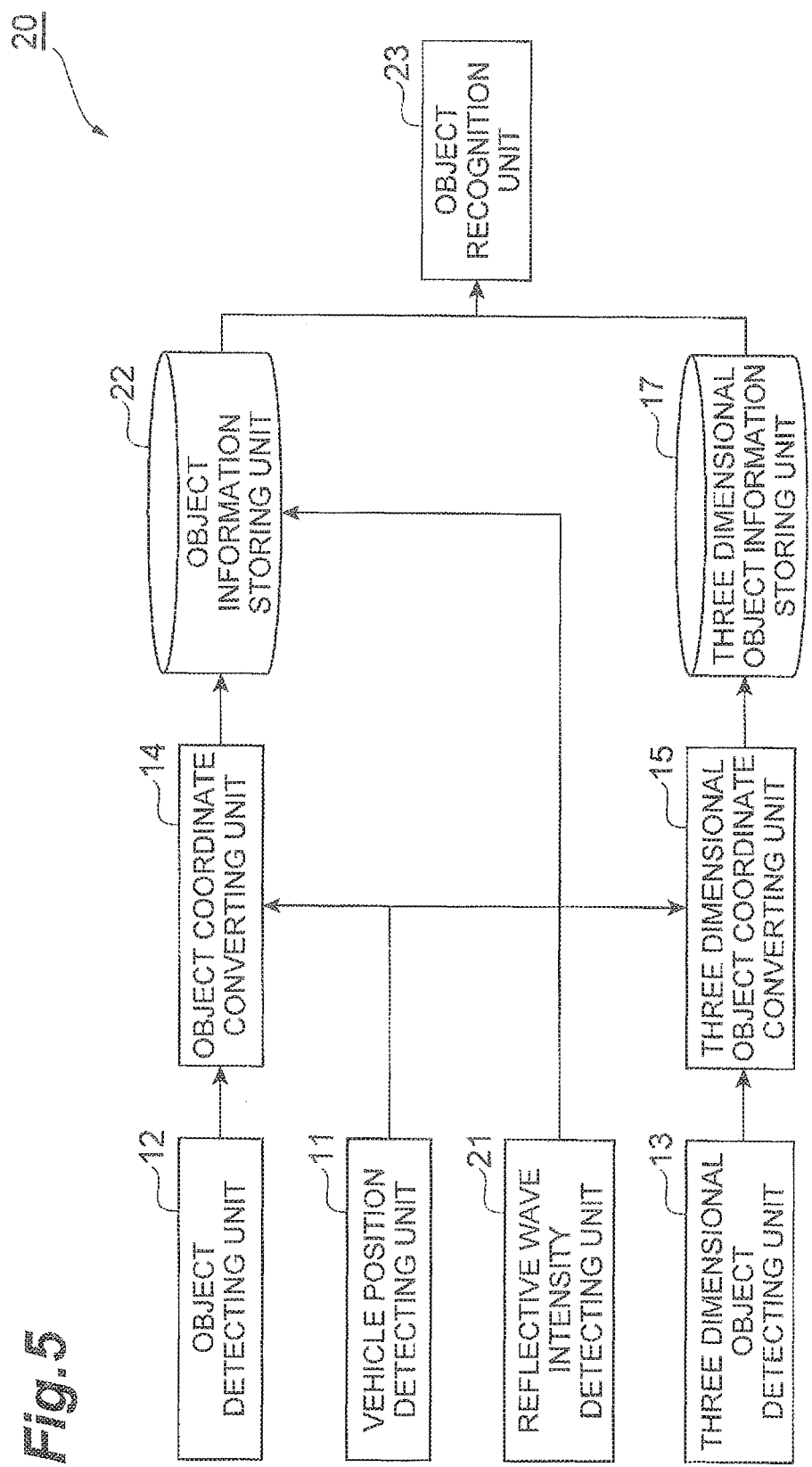
FIG. 5 is a block diagram illustrating the configuration of a driving assist device according to a first modification example.

Subsequently, a driving assist device 20 according to a first modification example of the first embodiment will be described with reference to FIGS. 5 to 7. The driving assist device 20 according to the first modification example properly recognizes an obstacle having a relatively weak reflective wave intensity by taking account of the intensity of a reflective wave from the object. Here, the obstacle having a relatively weak reflective wave intensity represents the fixed objects such as a crossing gate, a metallic net, or a wooden fence, which are an obstacle to the movement of the vehicle. Hereinafter, compared to the first embodiment, the points of differences will be mainly described.

First, the configuration of the driving assist device 20 according to the first modification example will be described with reference to FIG. 5. FIG. 5 is a block diagram illustrating the configuration of the driving assist device 20 according to the first modification example. As illustrated in FIG. 5, the driving assist device 20 includes a reflective wave intensity detecting unit 21; an object information storing unit 22 (first storage unit); and an object recognition unit 23, in addition to the vehicle position detecting unit 11; the object detecting unit 12; the three dimensional object detecting unit 13; the object coordinate converting unit 14; the three dimensional object coordinate converting unit 15; and the three dimensional object information storing unit 17 (second storage unit).

The respective functions of the vehicle position detecting unit 11; the object detecting unit 12; the three dimensional object detecting unit 13; the object coordinate converting unit 14; the three dimensional object coordinate converting unit 15; and the three dimensional object information storing unit 17 are the same as those in the first embodiment. An electronic control unit (ECU) or the like mounted in the vehicle realizes at least a part of the functions of the driving assist device 20, particularly, the function of each of the object coordinate converting unit 14, the three dimensional object coordinate converting unit 15, the three dimensional object information storing unit 17, the object information storing unit 22, and the object recognition unit 23.

The reflective wave intensity detecting unit 21 detects the intensity of a reflective wave (reflective wave intensity) from the object in the vicinity of the vehicle. The reflective wave intensity changes depending on the size, shape, material, or the like of the object. The reflective wave intensity of each of a crossing gate, a metallic net, a wooden fence, or the like is weak relative to a preceding vehicle, a manhole, or the like. The reflective wave intensity detecting unit 21 may be formed integrally with the object detecting unit 12 which is a millimeter radar sensor or the like.

The object information storing unit 22 stores the reflective wave intensity of the object together with the position of the object in the global coordinate system as the object information of the object in the vicinity of the vehicle. The position of the object is supplied from the object coordinate converting unit 14, and the reflective wave intensity of the object is supplied from the reflective wave intensity detecting unit 21.

The object recognition unit 23 recognizes an obstacle having a relatively weak reflective wave intensity by comparing the position of the object with the position of the three dimensional object, and determining the reflective wave intensity of the object. The reflective wave intensity is determined by comparing the reflective wave intensity of the object with a set threshold value. The set threshold value is set to the weakest reflective wave intensity that is expected from the object such as a preceding vehicle or a manhole. That is, the object having reflective wave intensity of less than the set threshold is recognized as an obstacle that has a relatively weak reflective wave intensity.

When the three dimensional object detecting unit 13 detects the three dimensional object at a position in which the object is detected by the object detecting unit 12, the object recognition unit 23 keeps this object as a determination candidate. The object recognition unit 23 determines whether the reflective wave intensity of the determination candidate is less than the set threshold value (and the reflective wave intensity is 0 or greater). Since the reflective wave intensity supplied from the reflective wave intensity detecting unit 21 is an instantaneous value when being detected, the reflective wave intensity preferably undergoes statistical processing such as filtering.

Here, in the first modification example, it is assumed that the reflective wave intensity is determined by storing the position of the object and the position of the three dimensional object as the object information and the three dimensional object information, respectively, and comparing the positions with each other based on the object information and the three dimensional object information. Similar to in the first embodiment, the positions may be compared with each other and the reflective wave intensity may be determined based on a result of detecting the object and a result of detecting the three dimensional object, the object information and a result of detecting the three dimensional object, or a result of detecting the object and the three dimensional object information.

Subsequently, the operation of the driving assist device 20 according to the first modification example will be described with reference to FIGS. 6 to 7. FIG. 6 is a flowchart illustrating the operation of the driving assist device 20 according to the first modification example. The driving assist device 20 repeatedly executes a process illustrated in FIG. 6 at each predetermined interval. Step S11, steps S12 to S14, and steps S15, S31, S16, and S32 which will be described below may be executed in an inverted sequence regardless of the above-mentioned sequence.

Figure 6:
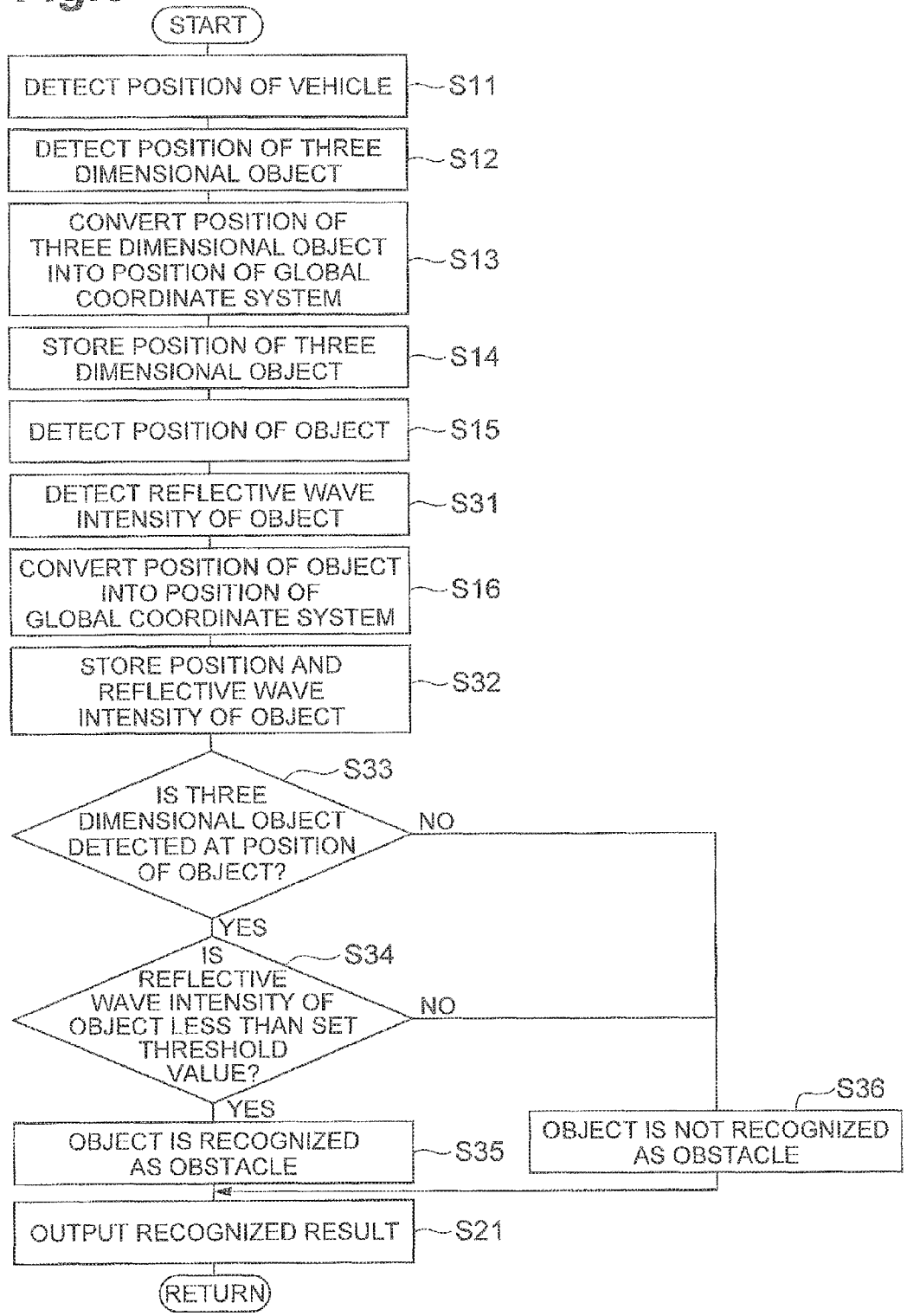
FIG. 6 is a flowchart illustrating the operation of the driving assist device according to the first modification example.

As illustrated in FIG. 6, the vehicle position detecting unit 11 detects the position of the vehicle in the global coordinate system (step S11). The three dimensional object detecting unit 13 detects the position of the three dimensional object in the vicinity of the vehicle in the local coordinate system (S12). The three dimensional object coordinate converting unit 15 converts the position of the three dimensional object into a position in the global coordinate system (S13). The three dimensional object information storing unit 17 stores the position of the three dimensional object in the global coordinate system (S14).

The object detecting unit 12 detects the position of the object in the vicinity of the vehicle in the local coordinate system (S15). The reflective wave intensity detecting unit 21 detects the reflective wave intensity of the object (S31). The object coordinate converting unit 14 converts the position of the object into a position in the global coordinate system (S16). The object information storing unit 22 stores the position of the object in the global coordinate system and the reflective wave intensity in conjunction with each other (S32).

The object recognition unit 23 determines whether the three dimensional object is detected at the position of the object using the object information and the three dimensional object information (S33). For example, this determination may be made whenever the position of the object or the position of the three dimensional object is detected, or at each predetermined interval. When it is determined that the three dimensional object is detected at the position of the object, the object recognition unit 23 determines whether the reflective wave intensity of the object is less than the set threshold value (S34). When it is determined that the reflective wave intensity is less than the set threshold value, the object recognition unit 23 recognizes the object as an obstacle (S35).

In contrast, when it is not determined that the three dimensional object is detected at the position of the object at step S33, or the reflective wave intensity is less than the set threshold value at step S34, the object recognition unit 23 does not recognize the object as an obstacle (S36). Subsequent to step S35 or S36, the object recognition unit 23 outputs the recognized result for the next process (S21). The recognized result is used indirectly or directly to assist the driver in driving the vehicle, for example, for the acceleration and deceleration control or the steering control of the vehicle, where being accumulated as the object information.

FIG. 7 shows schematic views illustrating the respective detected results of the object detecting unit 12 and the three dimensional object detecting unit 13, with the detected results compared with each other. In the example illustrated in FIG. 7(*a*), the preceding vehicle O1, the manhole O2, and the crossing gate O3 exist on a travelling road of the vehicle C.

At this time, as illustrated in FIG. 7(*b*), each of the preceding vehicle O1, the manhole O2, and the crossing gate O3 is detected as an object. As illustrated in FIG. 7(*c*), the preceding vehicle O1 and the crossing gate O3 are detected as three dimensional objects. Accordingly, the manhole O2, which is detected as an object but is not detected as a three dimensional object, is recognized as a non-obstacle, and is not recognized as an obstacle.

Here, a reflective wave intensity R1 of the preceding vehicle O1 is detected as being the set threshold value or greater, and a reflective wave intensity R3 of the crossing gate O3 is detected as being less than the set threshold value. The crossing gate O3, of which the reflective wave intensity R3 is less than the set threshold value, is recognized as an obstacle.

As described above, it is possible for the driving assist device 20 according to the first modification example to properly recognize an obstacle having a relatively weak reflective wave intensity by taking account of the intensity of a reflective wave from the object. That is, since the object having reflective wave intensity of less than the set threshold value is recognized as an obstacle, it is possible to properly recognize the obstacle having a relatively weak reflective wave intensity.

Figure 8:
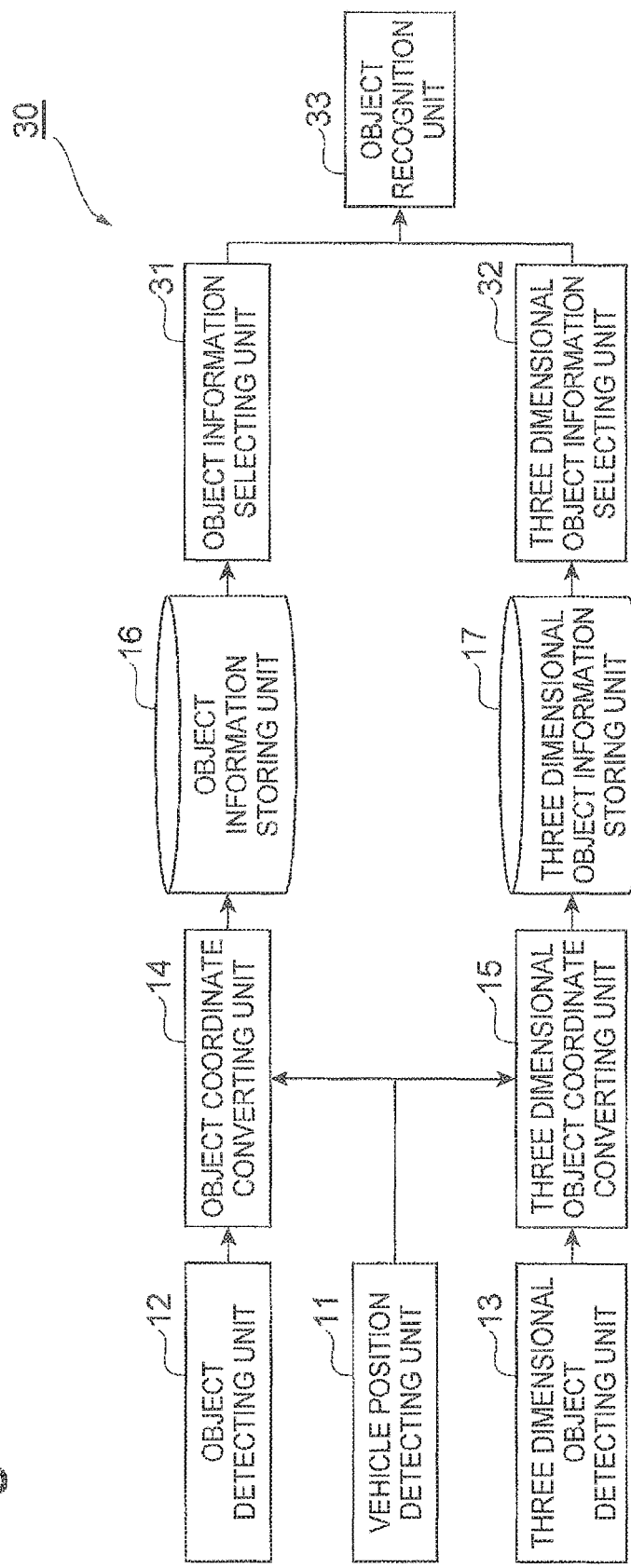
FIG. 8 is a block diagram illustrating the configuration of a driving assist device according to a second modification example.
Figure 9:
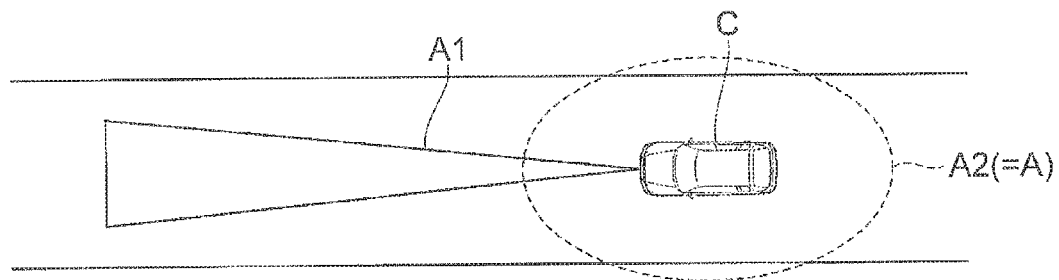
FIG. 9 is a schematic view illustrating a vicinity range of the vehicle.

Subsequently, a driving assist device 30 according to a second modification example of the first embodiment will be described with reference to FIGS. 8 to 10. The driving assist device 30 according to the second modification example efficiently recognizes the object by taking account of the respective detection ranges of the object detecting unit 12 and the three dimensional object detecting unit 13. Hereinafter, compared to the first embodiment, the points of differences will be mainly described.

First, the configuration of the driving assist device 30 according to the second modification example will be described with reference to FIG. 8. FIG. 8 is a block diagram illustrating the configuration of the driving assist device 30 according to the second modification example. As illustrated in FIG. 8, the driving assist device 30 includes an object information selecting unit 31; a three dimensional object information selecting unit 32; and an object recognition unit 33, in addition to the vehicle position detecting unit 11; the object detecting unit 12; the three dimensional object detecting unit 13; the object coordinate converting unit 14; the three dimensional object coordinate converting unit 15; the object information storing unit 16 (first storage unit); and the three dimensional object information storing unit 17 (second storage unit).

The respective functions of the vehicle position detecting unit 11; the object detecting unit 12; the three dimensional object detecting unit 13; the object coordinate converting unit 14; the three dimensional object coordinate converting unit 15; the object information storing unit 16; and the three dimensional object information storing unit 17 are the same as those in the first embodiment. An electronic control unit (ECU) or the like mounted in the vehicle realizes at least a part of the functions of the driving assist device 30, particularly, the function of each of the object coordinate converting unit 14, the three dimensional object coordinate converting unit 15, the object information storing unit 16, the three dimensional object information storing unit 17, the object information selecting unit 31, the three dimensional object information selecting unit 32, and the object recognition unit 33.

In the second modification example, a vicinity range of the vehicle is set. FIG. 9 is a schematic view illustrating a vicinity range A of the vehicle C. As illustrated in FIG. 9, the vicinity range A of the vehicle C is a detection range having a narrow detection range or a short detection distance between the respective detection ranges A1 and A2 of the object detecting unit 12 and the three dimensional object detecting unit 13, and the vicinity range A is pre-set in the local coordinate system. In the example illustrated in FIG. 9, the vicinity range A of the vehicle C is set as the detection range A2 of the three dimensional object detecting unit 13, the detection distance of which is relatively short.

That is, in the respective detection ranges (detectable ranges) A1 and A2 of the object detecting unit 12 and the three dimensional object detecting unit 13, with regard to at least the detectable range in a forward direction of the vehicle C, a position farthest from the vehicle C which is detectable by the object detecting unit 12 is set to be located with respect to the vehicle C farther than a position farthest from the vehicle C which is detectable by the three dimensional object detecting unit 13. Accordingly, for example, when it takes greater time for the three dimensional object detecting unit 13 to scan the vicinity of the vehicle C with a laser beam in three dimensions than the time it takes for the object detecting unit 12 to scan the vicinity of the vehicle C therewith in two dimensions, it is possible to absorb a difference between the scanning times by setting the detection range of the object detecting unit 12 to a large range.

The object information selecting unit 31 selects the object information of the object existing within the vicinity range of the vehicle among pieces of the object information stored in the object information storing unit 16. First, the object information selecting unit 31 converts the vicinity range into a global coordinate based on the position of the vehicle. The object information selecting unit 31 selects the object information of the object existing in the vicinity range by comparing the converted vicinity range with the object information.

The three dimensional object information selecting unit 32 selects the three dimensional object information of the three dimensional object existing within the vicinity range of the vehicle among pieces of the three dimensional object information stored in the three dimensional object information storing unit 17. The three dimensional object information selecting unit 32 converts the vicinity range into a global coordinate based on the position of the vehicle. The three dimensional object information selecting unit 32 selects the object information of the three dimensional object existing within the vicinity range by comparing the converted vicinity range with the three dimensional object information.

For example, the object recognition unit 33 recognizes a non-obstacle by comparing the object information with the three dimensional object information. The object recognition unit 33 acquires the selected object information and the selected three dimensional object information. When the object recognition unit 33 cannot acquire the three dimensional object information, or when the three dimensional object indicated by the acquired three dimensional object information does not exist at the position of the object indicated by the acquired object information, the object recognition unit 33 recognizes the object as a non-obstacle. Accordingly, the driving assist device 30 can skip a comparison between the respective positions of the objects that do not exist within the vicinity range.

Subsequently, the operation of the driving assist device 30 according to the second modification example will be described with reference to FIGS. 10 to 11. FIG. 10 a flowchart illustrating the operation of the driving assist device 30 according to the second modification example. The driving assist device 30 repeatedly executes a process illustrated in FIG. 10 at each predetermined interval. In FIG. 10, steps S12 to S14 may be executed between step S42 and step S44.

Figure 10:
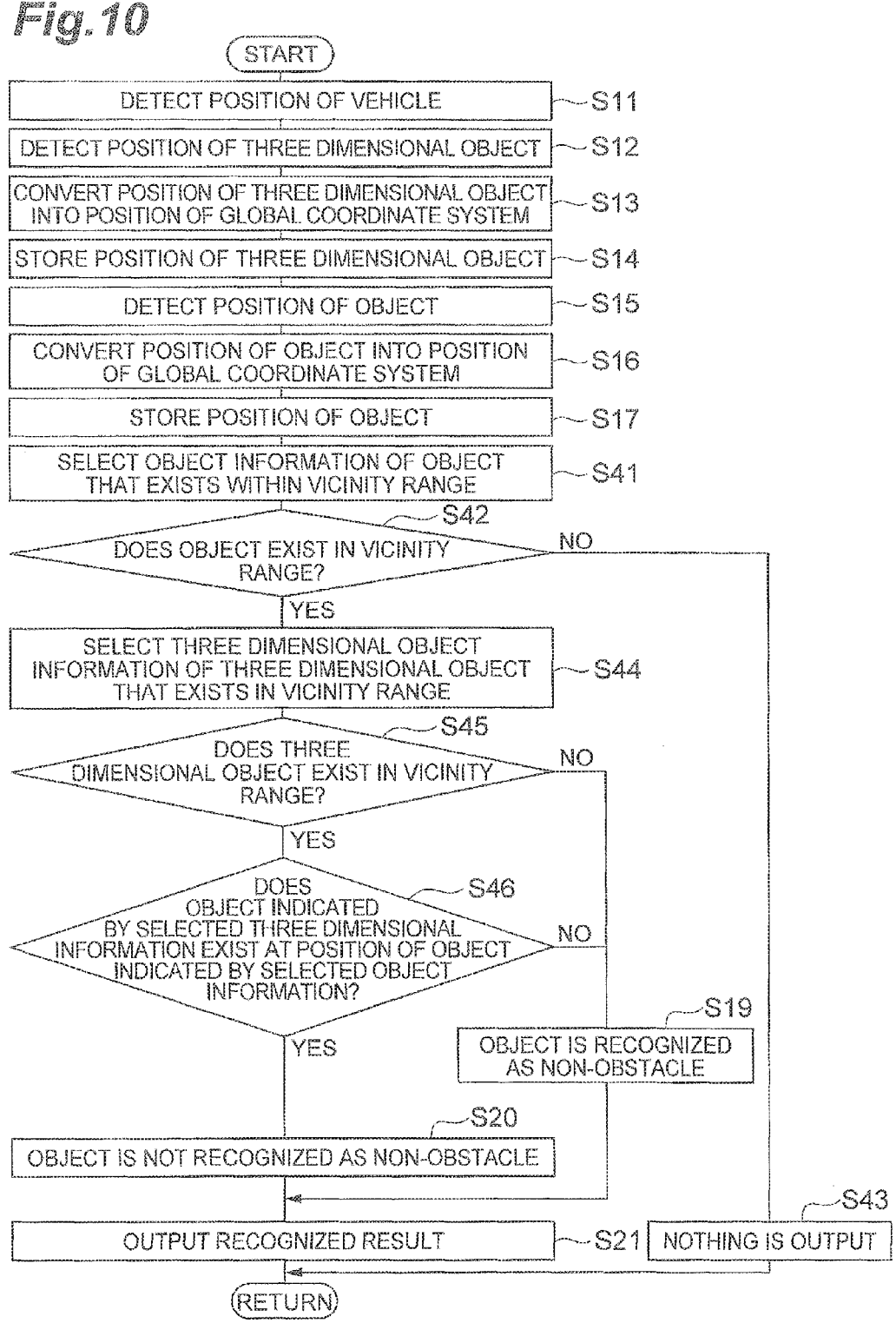
FIG. 10 is a flowchart illustrating the operation of a driving assist device according to the second modification example.

As illustrated in FIG. 10, the vehicle position detecting unit 11 detects the position of the vehicle in the global coordinate system (step S11). The three dimensional object detecting unit 13 detects the position of the three dimensional object in the vicinity of the vehicle in the local coordinate system (S12). The three dimensional object coordinate converting unit 15 converts the position of the three dimensional object into a position in the global coordinate system (S13). The three dimensional object information storing unit 17 stores the position of the three dimensional object in the global coordinate system (S14). The object detecting unit 12 detects the position of the object in the vicinity of the vehicle in the local coordinate system (S15). The object coordinate converting unit 14 converts the position of the object into a position in the global coordinate system (S16). The object information storing unit 16 stores the position of the object in the global coordinate system (S17).

The object information selecting unit 31 selects the object information of the object existing within the vicinity range, based on the vicinity range of the vehicle and the object information (S41). The object recognition unit 33 determines whether the object exists within the vicinity range, based on a result of a selection of the object information (S42). Here, when it is not determined that the object exists within the vicinity range, that is, when not only an obstacle such as a vehicle but also a non-obstacle such as a manhole do not exist, the object recognition unit 33 ends the process without outputting the recognized result for the next process (S43).

In contrast, when it is determined that the object exists within the vicinity range at step S42, the three dimensional object information selecting unit 32 selects the three dimensional object information of the three dimensional object existing within the vicinity range, based on the vicinity range of the vehicle and the three dimensional object information (S44). The object recognition unit 33 determines whether the three dimensional object exists within the vicinity range, based on a result of a selection of the three dimensional object information (S45). The object recognition unit 33 determines whether the three dimensional object indicated by the selected three dimensional object information exists at the position of the object indicated by the selected object information (S46).

When it is determined that the three dimensional object exists within the vicinity range at step S45, and the three dimensional object indicated by the selected three dimensional object information exists at the position of the object indicated by the selected object information at step S46, the object recognition unit 33 does not recognize the object as a non-obstacle. At this time, an obstacle such as a vehicle is not recognized as a non-obstacle, in which the vehicle is not only the object but also the three dimensional object.

In contrast, when it is not determined that the three dimensional object exists within the vicinity range at step S45, and the three dimensional object indicated by the selected three dimensional object information exists at the position of the object indicated by the selected object information at step S46, the object recognition unit 33 recognizes the object as a non-obstacle. At this time, a non-obstacle such as a manhole is recognized as a non-obstacle, in which the manhole is the object but not the three dimensional object.

Subsequent to step S19 or S20, the object recognition unit 33 outputs the recognized result for the next process (S21). The recognized result is used indirectly or directly to assist the driver in driving the vehicle, for example, for the acceleration and deceleration control or the steering control of the vehicle, where being accumulated as the object information.

Figure 11:
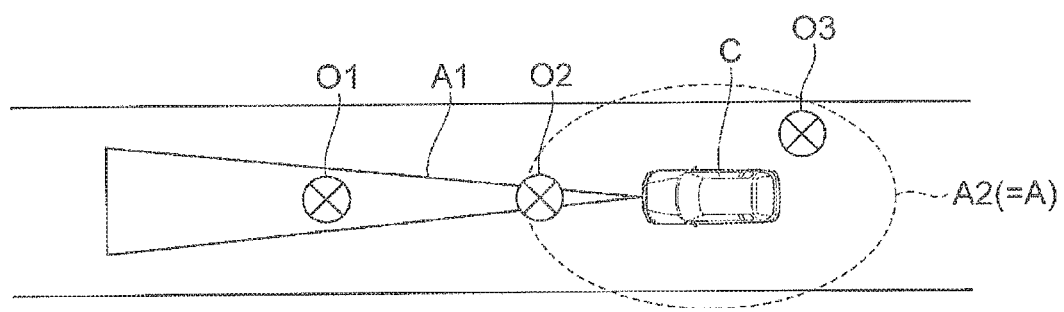
FIG. 11 is a schematic view illustrating the respective detected results of the object detecting unit and the three dimensional object detecting unit, with the detected results compared with each other.

FIG. 11 is a schematic view illustrating the respective detected results of the object detecting unit 12 and the three dimensional object detecting unit 13. In the example illustrated in FIG. 11, a first manhole O1, a second manhole O2, and a third manhole O3 exist on a travelling road of the vehicle C. The first manhole O1 is detected as an object out of the vicinity range A of the vehicle C, and the second manhole O2 is detected as an object within the vicinity range A. The third manhole O3 is pre-detected as an object within the vicinity range A.

At this time, the first manhole O1 existing out of the vicinity range A is not a target for recognition. In contrast, each of the second manhole O2 and the third manhole O3 existing within the vicinity range A is recognized as an object that is recognized as an object but is not recognized as a three dimensional object, that is, as a non-obstacle.

In the description above, a non-obstacle is recognized by taking account of the respective detection ranges of the object detecting unit 12 and the three dimensional object detecting unit 13. However, in the second modification example, as described in the first modification example, the same can also be applied when an obstacle is recognized. At this time, the object recognition unit 33 recognizes the object as an obstacle, in which the object is detected as both an object and a three dimensional object within the vicinity range, and has a reflective wave intensity of less than the set threshold value.

As described above, it is possible for the driving assist device 30 according to the second modification example to efficiently recognize the object by taking account of the respective detection ranges of the object detecting unit 12 and the three dimensional object detecting unit 13. That is, since the position of the object is compared with the position of the three dimensional object in the detection range that has a narrow detection range or a short detection distance, the comparison between the positions is efficiently performed.

Figure 12:
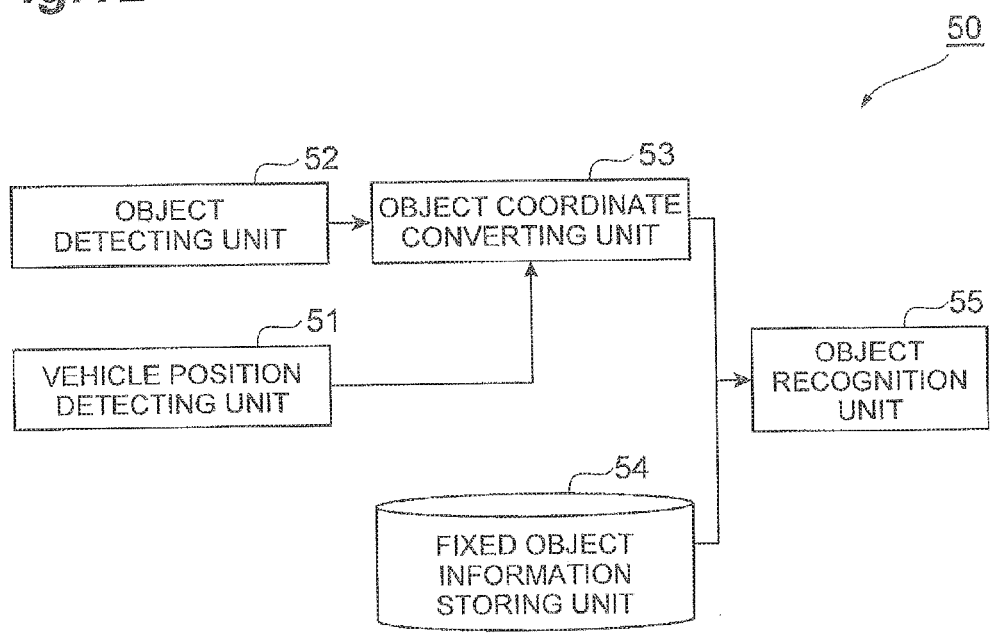
FIG. 12 is a block diagram illustrating the configuration of a driving assist device according to a second embodiment.

Hereinafter, a driving assist device 50 according to a second embodiment will be described with reference to FIGS. 12 to 14. The driving assist device 50 according to the second embodiment recognizes a non-obstacle based on fixed object information of the fixed object and a result of detecting the object in the vicinity of the vehicle. Here, the non-obstacle represents the fixed objects such as a manhole and a reflective plate which is not an obstacle to the movement of the vehicle.

First, the configuration of the driving assist device 50 according to the second embodiment will be described with reference to FIG. 12. FIG. 12 is a block diagram illustrating the configuration of the driving assist device 50 according to the second embodiment. As illustrated in FIG. 12, the driving assist device 50 includes a vehicle position detecting unit 51; an object detecting unit 52; an object coordinate converting unit 53; a fixed object information storing unit 54 (storage unit); and an object recognition unit 55.

An electronic control unit (ECU) or the like mounted in the vehicle realizes at least a part of the functions of the driving assist device 50, particularly, the function of each of the object coordinate converting unit 53, the fixed object information storing unit 54, and the object recognition unit 55. The ECU includes a CPU, a ROM, a RAM, and the like, and the CPU executes a program stored in the ROM or the like on the RAM.

The vehicle position detecting unit 51 detects the position of the vehicle. For example, the vehicle position detecting unit 51 is a GPS sensor. The position of the vehicle is detected based on a detected value of the sensor. The current position is expressed in the global coordinate system, that is, by latitude and longitude.

The object detecting unit 52 detects the position of the object in the vicinity of the vehicle. For example, the object detecting unit 52 is a radar sensor, and preferably a millimeter-wave radar sensor. The position of the object is detected based on a detection value of the sensor. The object detecting unit 52 detects the position of the object and the speed of the object relative to the vehicle by transmitting a radio wave to the vicinity of the vehicle, particularly, forward of the vehicle, and receiving a reflected wave. The position of the object is expressed in an inherent local coordinate system of the sensor, that is, by the distance and angle of the object relative to the vehicle.

The object coordinate converting unit 53 converts the position of the object expressed in the local coordinate system into a position expressed in the global coordinate system. The position in the local coordinate system supplied from the object detecting unit 52 is converted into a position in the global coordinate system based on the position of the vehicle supplied from the vehicle position detecting unit 51. The position of the object is converted by taking account of not only the position of the vehicle but also the moving direction of the vehicle obtained from a change in the position of the vehicle.

The fixed object information storing unit 54 stores information of an non-obstacle, particularly, the position of the non-obstacle as fixed object information. The non-obstacle represents the objects such as a manhole and a reflective plate which is not an obstacle to the movement of the vehicle. The position of the object is expressed in the global coordinate system, that is, by latitude and longitude.

The object recognition unit 55 recognizes a non-obstacle by comparing the position of the detected object with the fixed object information, that is, the position of the non-obstacle. Accordingly, the driving assist device 50 can recognize the object as a non-obstacle. When comparing the positions, instead of converting the position of the object into a position in the global coordinate system, the position of the object indicated by the fixed object information may be converted into a position in the local coordinate system of the object detecting unit 52, and may be compared with the position of the object expressed in the local coordinate system.

Subsequently, the operation of the driving assist device 50 according to the second embodiment will be described with reference to FIGS. 13 to 14. FIG. 13 is a flowchart illustrating the operation of the driving assist device 50 according to the second embodiment. The driving assist device 50 repeatedly executes a process illustrated in FIG. 13 at each predetermined interval.

Figure 13:
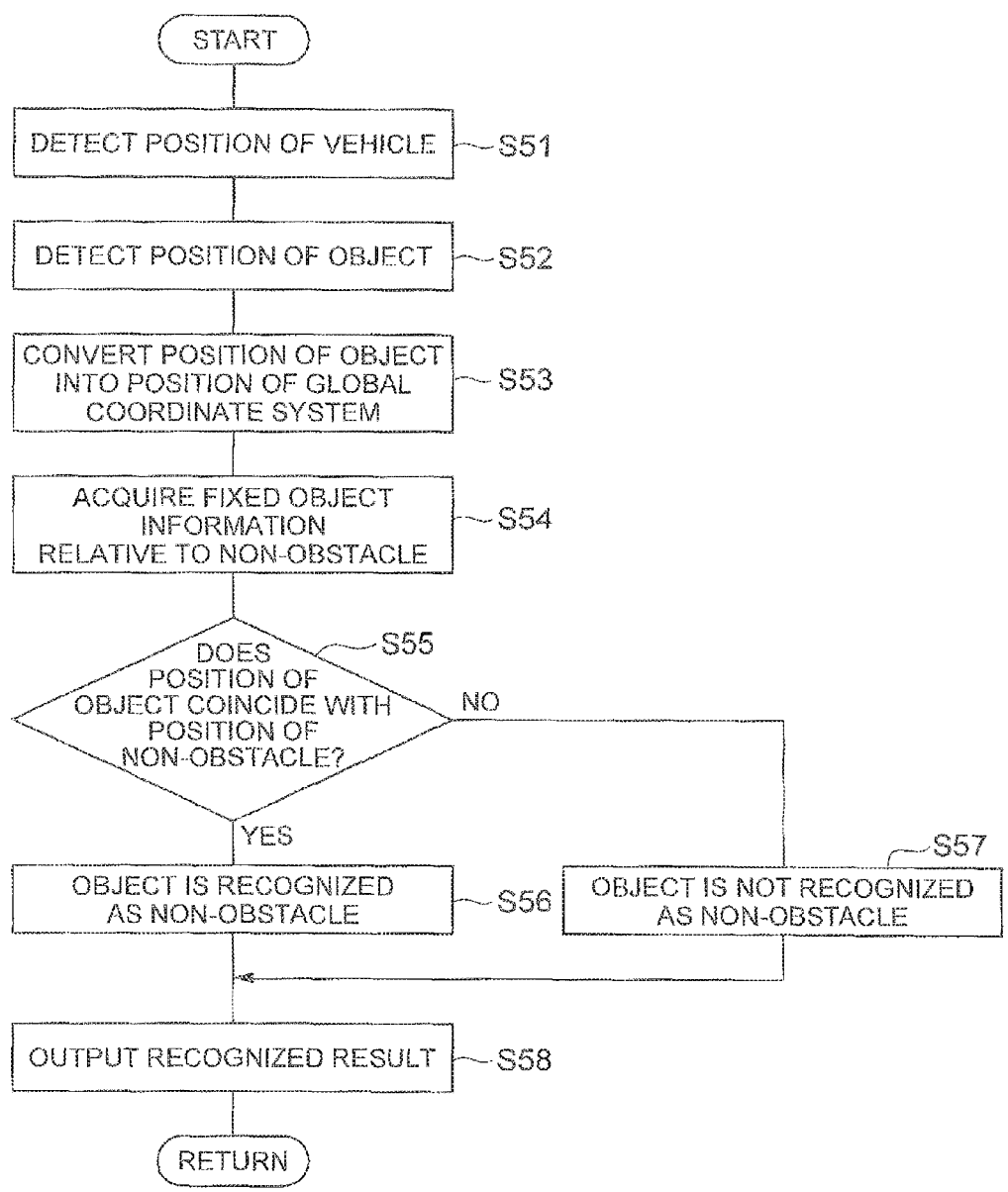
FIG. 13 is a flowchart illustrating the operation of the driving assist device according to the second embodiment.

As illustrated in FIG. 13, the vehicle position detecting unit 51 detects the position of the vehicle in the global coordinate system (step S51). The object detecting unit 52 detects the position of the object in the vicinity of the vehicle in the local coordinate system (S52). The object coordinate converting unit 53 converts the position of the object into a position in the global coordinate system (S53). The object recognition unit 55 acquires the fixed object information relative to a non-obstacle (S54). For example, the fixed object information may be acquired whenever the position of the object is detected, or at each predetermined interval. The object recognition unit 55 determines whether the position of the detected object coincides with the position of the non-obstacle (S55).

When it is determined that the position of the object coincides with the position of the non-obstacle, the object recognition unit 55 recognizes the object as a non-obstacle (S56). In contrast, when it is not determined that the position of the object coincides with the position of the non-obstacle at step S55, the object recognition unit 55 does not recognize the object as a non-obstacle (S57). Subsequent to step S56 or S57, the object recognition unit 55 outputs the recognized result for the next process (S58). For example, the recognized result is used to assist the driver in driving the vehicle, for example, for the acceleration and deceleration control or the steering control of the vehicle.

FIG. 14 shows schematic views illustrating a detected result of the object detecting unit 52 and the fixed object information, with the detected result and the fixed object information compared with each other. In the example illustrated in FIG. 14(a), the preceding vehicle O1 and the manhole O2 are detected on a travelling road of the vehicle C. Accordingly, if the fixed object information is not taken into consideration, it is not possible to recognize the manhole O2 as a non-obstacle. However, as illustrated in FIG. 14(b), if the fixed object information is taken into consideration, it is possible to assume that a non-obstacle exists at the position in which the manhole O2 is detected. For this reason, it is possible to recognize the manhole O2 as a non-obstacle.

As described above, the driving assist device 50 according to the second embodiment can recognize a non-obstacle based on the fixed information relative to the non-obstacle and a result of detecting the object in the vicinity of the vehicle. That is, since the object stored as a non-obstacle is recognized as a non-obstacle, it is possible to prevent the non-obstacle from being erroneously recognized as an obstacle.

Figure 15:
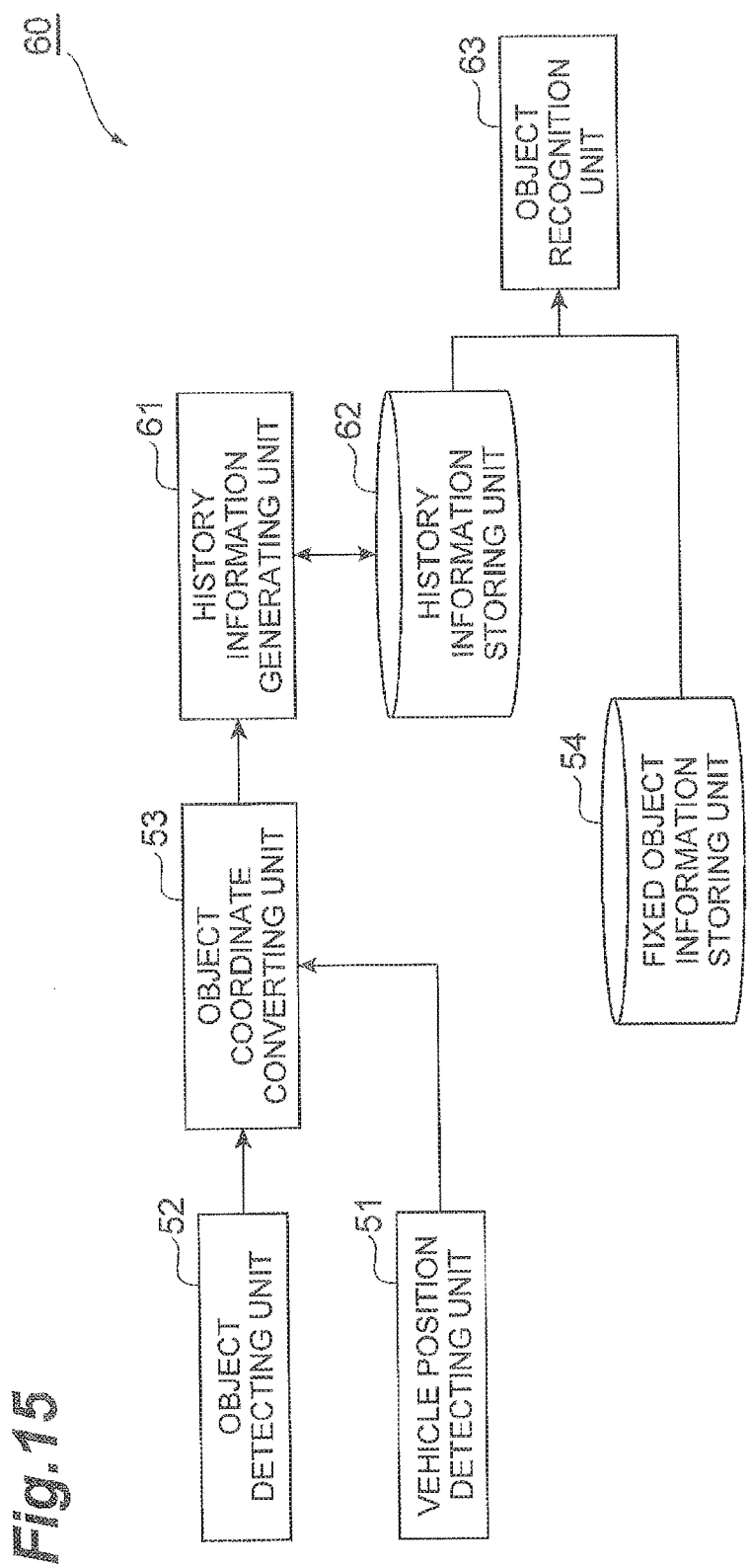
FIG. 15 is a block diagram illustrating the configuration of the driving assist device according to a first modification example.

Subsequently, a driving assist device 60 according to a first modification example of the second embodiment will be described with reference to FIGS. 15 to 17. The driving assist device 60 according to the first modification example properly recognizes a non-obstacle by taking account of a moving history of the object. Hereinafter, compared to the second embodiment, the points of differences will be mainly described.

First, the configuration of the driving assist device 60 according to the first modification example will be described with reference to FIG. 15. FIG. 15 is a block diagram illustrating the configuration of the driving assist device 60 according to the first modification example. As illustrated in FIG. 15, the driving assist device 60 includes a history information generating unit 61; a history information storing unit 62; and an object recognition unit 63, in addition to the vehicle position detecting unit 51; the object detecting unit 52; the object coordinate converting unit 53; and the fixed object information storing unit 54 (storage unit).

The respective functions of the vehicle position detecting unit 51; the object detecting unit 52; the object coordinate converting unit 53; and the fixed object information storing unit 54 are the same as those in the second embodiment. An electronic control unit (ECU) or the like mounted in the vehicle realizes at least a part of the functions of the driving assist device 60, particularly, the function of each of the object coordinate converting unit 53, the fixed object information storing unit 54, the history information generating unit 61, the history information storing unit 62, and the object recognition unit 63.

The history information generating unit 61 generates history information indicative of the moving history of the object. The history information is information indicative of a position history and a speed history of the object. The history information is obtained based on the position of the object in the global coordinate system which is supplied from the object coordinate converting unit 53. Since the position supplied from the object coordinate converting unit 53 is an instantaneous value when being detected, the position preferably undergoes statistical processing such as filtering.

The position history is obtained as a change in the position of the object, and the speed history is obtained as a change in position at each constant time. The history information may be obtained as the maximum value of the speed history, or as a flag indicating that the maximum value of the speed history is almost 0 km/hr. Instead of detecting the position of the object, the speed history may be obtained by detecting the speed of the object. It is possible to detect the speed of the object using a radar sensor, a wheel speed sensor, or the like.

The history information storing unit 62 stores the history information generated by the history information generating unit 61. The history information storing unit 62 supplies and receives the history information from the history information generating unit 61. That is, the history information storing unit 62 supplies the past history information to the history information generating unit 61, and acquires updated history information from the history information generating unit 61. The history information storing unit 62 preferably deletes the history information that is not updated during a predetermined period. The history information storing unit 62 can store history information of one or more objects.

The object recognition unit 63 properly recognizes a non-obstacle by comparing the position of the detected object with the fixed object information, and determining the history information of the object. The object recognition unit 63 specifies the moving object or the object, which is at a stop but has moved previously, as a moving object, based on the history information. The object recognition unit 63 does not recognize the moving object as a non-obstacle, but recognizes the moving object such as a preceding vehicle or the like.

Subsequently, the operation of the driving assist device 60 according to the first modification example will be described with reference to FIGS. 16 to 17. FIG. 16 is a flowchart illustrating the operation of the driving assist device 60 according to the first modification example. The driving assist device 60 repeatedly executes a process illustrated in FIG. 16 at each predetermined interval.

Figure 16:
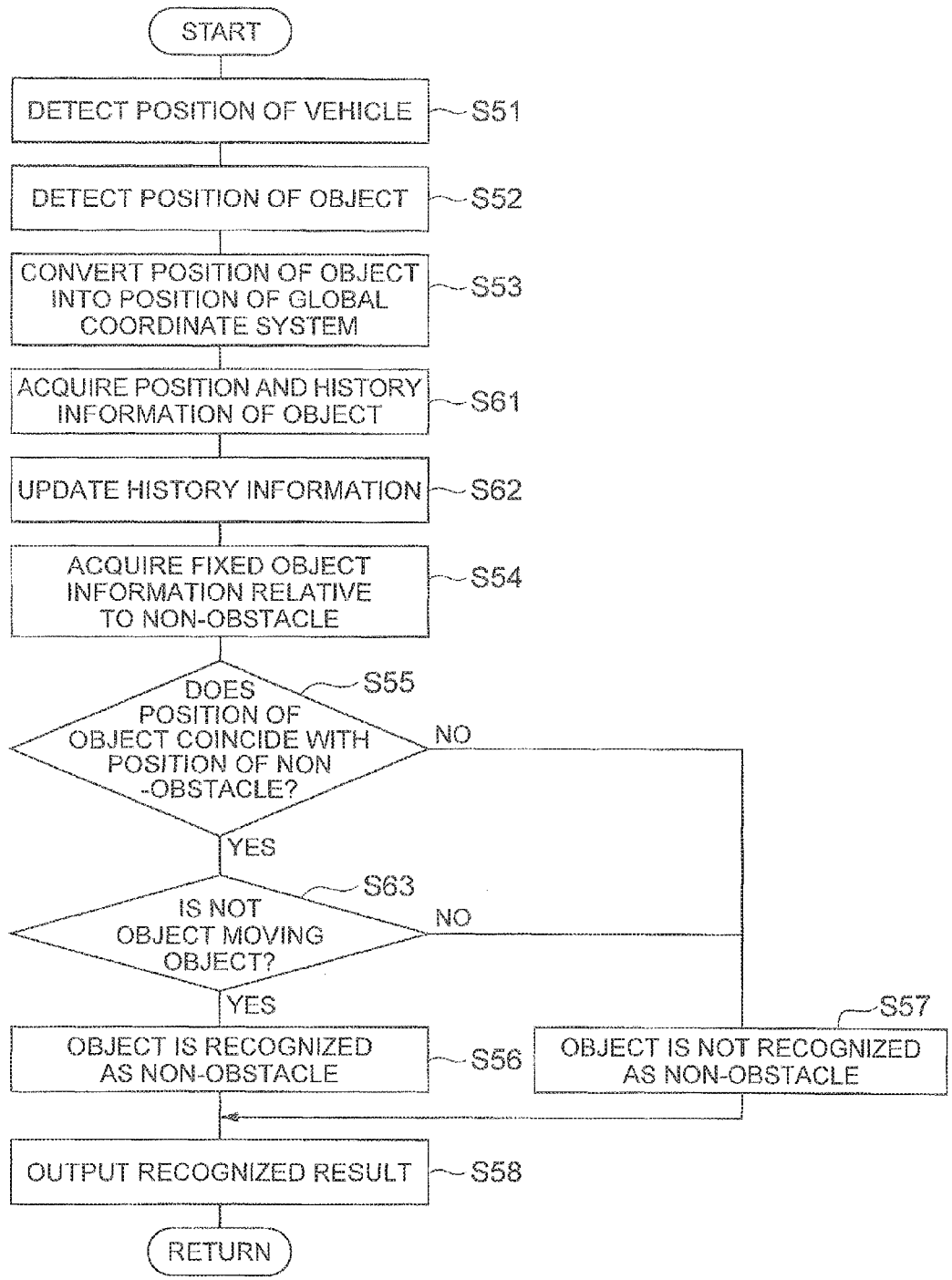
FIG. 16 is a flowchart illustrating the operation of the driving assist device according to the first modification example.

As illustrated in FIG. 16, the vehicle position detecting unit 51 detects the position of the vehicle in the global coordinate system (step S51). The object detecting unit 52 detects the position of the object in the vicinity of the vehicle in the local coordinate system (S52). The object coordinate converting unit 53 converts the position of the object into a position in the global coordinate system (S53). The history information generating unit 61 acquires the position of the object from the object coordinate converting unit 53, and acquires the history information of the object from the history information storing unit 62 (S61). The history information generating unit 61 updates the history information based on the acquired information, and supplies the updated history information to the history information storing unit 62 (S62). For example, when the current speed of the object exceeds the maximum value of the speed history, the history information generating unit 61 replaces the maximum value of the speed history with the current speed.

The object recognition unit 63 acquires the fixed object information relative to a non-obstacle (S54). The object recognition unit 63 determines whether the position of the object coincides with the position of the non-obstacle (S55). When it is determined that the position of the object coincides with the position of the non-obstacle, the object recognition unit 63 determines whether the object is not a moving object, based on the history information of the object (S63). For example, when the maximum value of the speed history of the object does not exceed 0 km/hr, the object recognition unit 63 determines that the object is not a moving object. When it is determined that the object is not a moving object, the object recognition unit 63 recognizes the object as a non-obstacle (S56).

In contrast, when it is not determined that the position of the object coincides with the position of the non-obstacle at step S55, or the object is not a moving body at S63, the object recognition unit 63 does not recognize the object as a non-obstacle (S57). Subsequent to step S56 or S57, the object recognition unit 63 outputs the recognized result for the next process (S58). For example, the recognized result is used to assist the driver in driving the vehicle, for example, for the acceleration and deceleration control or the steering control of the vehicle.

FIG. 17 shows schematic views illustrating results of detecting the object. FIG. 17 illustrates the preceding vehicle O1 that approaches the manhole O2. The preceding vehicle O1 is travelling, and the history information of the preceding vehicle O1 is generated at the time t1 illustrated in FIG. 17(a).

In contrast, at the time t2 illustrated in FIG. 17(b), the preceding vehicle O1 is temporarily stopped on the manhole O2, and the position of the preceding vehicle O1 coincides with the position of the manhole O2. Accordingly, if the history information of the preceding vehicle O1 is not taken into consideration, the preceding O1 may be recognized as a non-obstacle. However, since the preceding vehicle O1 is determined as a moving object based on the history information, the preceding vehicle O1 is not recognized as a non-obstacle.

As described above, the driving assist device 60 according to the first modification example can properly recognize a non-obstacle by taking account of the moving history of the object. That is, since the moving body is not recognized as a non-obstacle, a preceding vehicle or the like temporarily stopped at the position of the non-obstacle can be prevented from being recognized as a non-obstacle.

Figure 18:
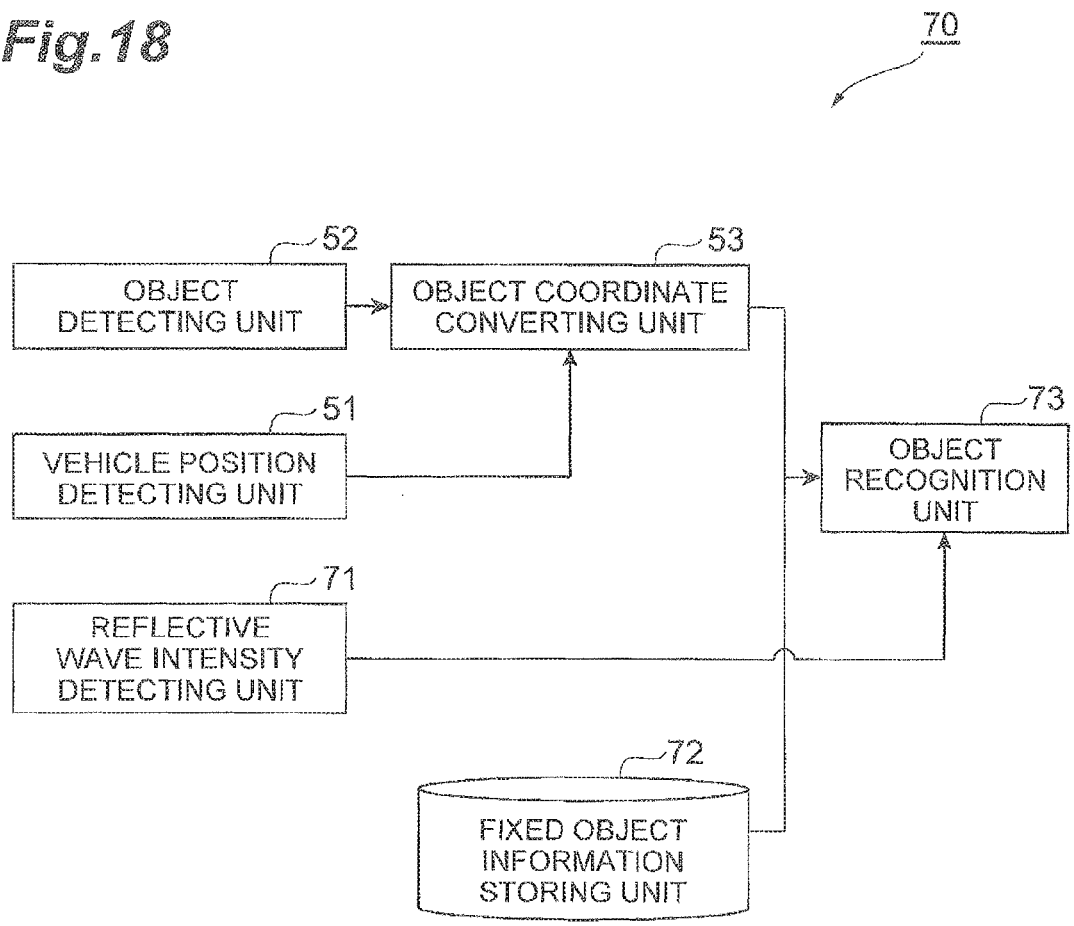
FIG. 18 is a block diagram illustrating the configuration of a driving assist device according to a second modification example.

Subsequently, a driving assist device 70 according to a second modification example of the second embodiment will be described with reference to FIGS. 18 to 20. The driving assist device 70 according to the second modification example properly recognizes an obstacle having a relatively weak reflective wave intensity by taking account of the intensity of a reflective wave from the object. Here, the obstacle having a relatively weak reflective wave intensity represents the fixed objects such as a crossing gate, a metallic net, or a wooden fence, which is an obstacle to the movement of the vehicle. Hereinafter, compared to the second embodiment, the points of differences will be mainly described.

First, the configuration of the driving assist device 70 according to the second modification example will be described with reference to FIG. 18. FIG. 18 is a block diagram illustrating the configuration of the driving assist device 70 according to the second modification example. As illustrated in FIG. 18, the driving assist device 70 includes a reflective wave intensity detecting unit 71; a fixed object information storing unit 72 (storage unit); and an object recognition unit 73, in addition to the vehicle position detecting unit 51; the object detecting unit 52; and the object coordinate converting unit 53.

The respective functions of the vehicle position detecting unit 51; the object detecting unit 52; and the object coordinate converting unit 53 are the same as those in the second embodiment. An electronic control unit (ECU) or the like mounted in the vehicle realizes at least a part of the functions of the driving assist device 70, particularly, the function of each of the object coordinate converting unit 53, the fixed object information storing unit 72, and the object recognition unit 73.

The reflective wave intensity detecting unit 71 detects the intensity of a reflective wave (reflective wave intensity) from the object in the vicinity of the vehicle. The reflective wave intensity changes depending on the size, shape, material, or the like of the object. The reflective wave intensity of each of a crossing gate, a metallic net, a wooden fence, or the like is weak relative to a preceding vehicle, a manhole, or the like. The reflective wave intensity detecting unit 71 may be formed integrally with the object detecting unit 52 which is a millimeter radar sensor or the like.

Unlike the second embodiment, the fixed object information storing unit 72 stores an expected intensity of a reflective wave expected to be reflected from the object together with the position of an obstacle, as the fixed object information. The obstacle is an object such as a crossing gate, a metallic net, or a wooden fence, which has a relatively weak reflective wave intensity. The position of the object is expressed in the global coordinate system, that is, by latitude and longitude. The expected intensity of a reflective wave is weaker than that of a reflective wave that is expected to be reflected from a preceding vehicle, a manhole, or the like, and is pre-set for each object.

The object recognition unit 73 recognizes an obstacle by comparing the position of the detected object with the fixed object information, that is, the position of the obstacle, and determining the reflective wave intensity. Since the reflective wave intensity supplied from the reflective wave intensity detecting unit 71 is an instantaneous value when being detected, the reflective wave intensity preferably undergoes statistical processing such as filtering.

Subsequently, the operation of the driving assist device 70 according to the second modification example of the second embodiment will be described with reference to FIGS. 19 to 20. FIG. 19 is a flowchart illustrating the operation of the driving assist device 70 according to the second modification example. The driving assist device 70 repeatedly executes a process illustrated in FIG. 19 at each predetermined interval.

Figure 19:
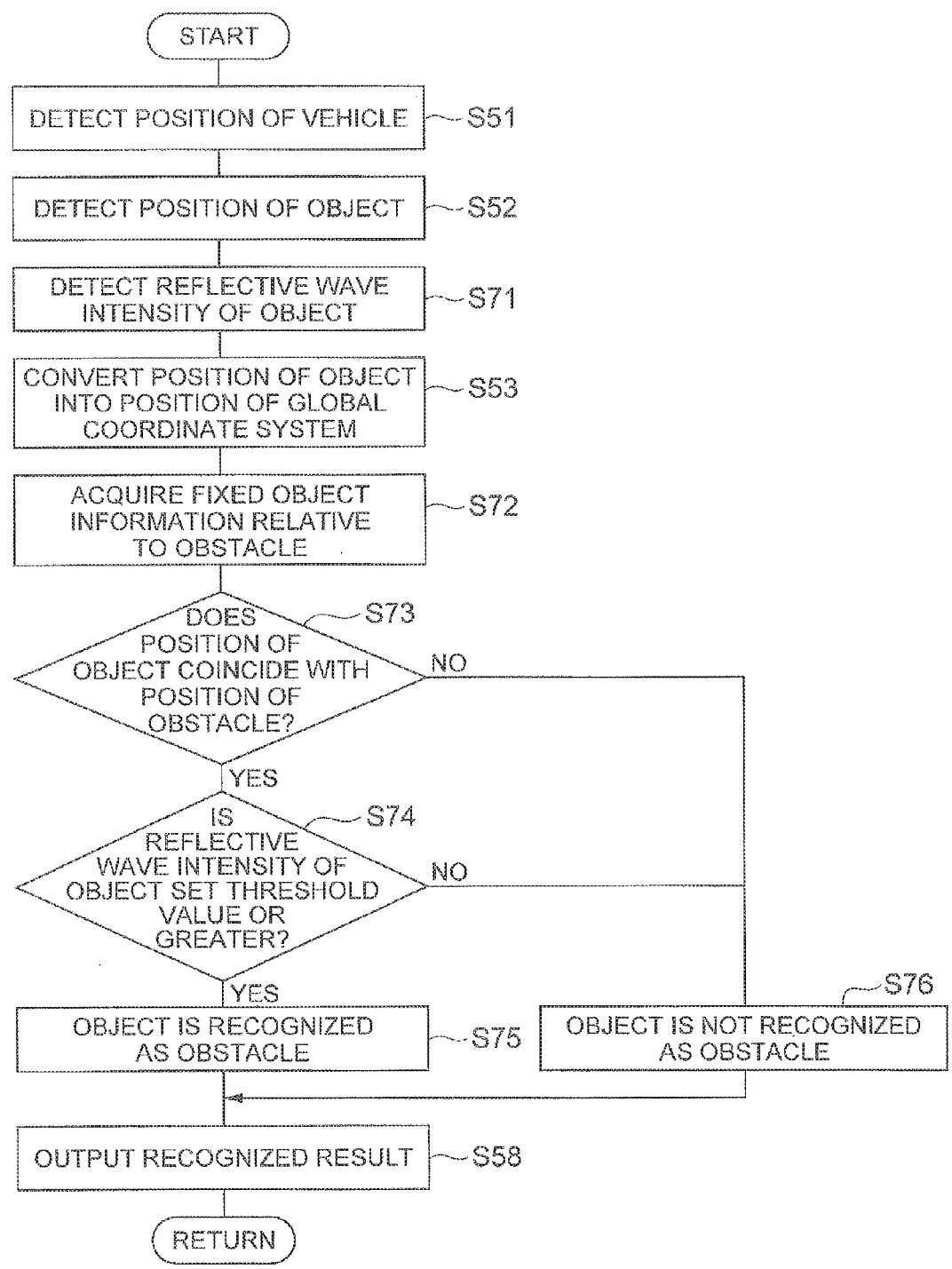
FIG. 19 is a flowchart illustrating the operation of the driving assist device according to the second modification example.

As illustrated in FIG. 19, the vehicle position detecting unit 51 detects the position of the vehicle in the global coordinate system (step S51). The object detecting unit 52 detects the position of the object in the vicinity of the vehicle in the local coordinate system (S52). The reflective wave intensity detecting unit 71 detects the reflective wave intensity of the object (S71). The object coordinate converting unit 53 converts the position of the object into a position in the global coordinate system (S53). The object recognition unit 73 acquires the fixed object information that contains the position of an obstacle and the expected intensity of a reflective wave (S72). The fixed object information is acquired as information of the obstacle existing in the vicinity of the vehicle, based on the position of the vehicle. The object recognition unit 73 determines whether the position of the object coincides with the position of the obstacle (S73).

When it is determined that the position of the object coincides with the position of the obstacle at step S73, the object recognition unit 73 determines whether the reflective wave intensity of the object is a set threshold value (expected intensity) or greater (S74). When it is determined that the reflective wave intensity is the set threshold value or greater at step S74, the object recognition unit 73 recognizes the object as an obstacle (S75).

In contrast, when it is not determined that the position of the object coincides with the position of the obstacle at step S73, or the reflective wave intensity of the object is the set threshold value or greater at step S74, the object recognition unit 73 does not recognize the object as an obstacle (S76). Subsequent to step S75 or S76, the object recognition unit 73 outputs the recognized result for the next process (S58). The recognized result is used to assist the driver in driving the vehicle, for example, the acceleration and deceleration control or the steering control of the vehicle.

FIG. 20 shows schematic views illustrating a detected result of the object detecting unit 52 and the fixed object information, with the detected result and the fixed object information compared with each other. In the example illustrated in FIG. 20(*a*), the preceding vehicle O1 and the crossing gate O2 exist on a travelling road of the vehicle C. At this time, as illustrated in FIG. 20(*b*), the reflective wave R1 is detected at the position of the preceding vehicle O1, and the reflective wave R2 is detected at the position of the crossing gate O2. The reflective wave R2 at the position of the crossing gate O2 is weaker than the intensity of a reflective wave that is expected to be reflected from the preceding vehicle O1. Accordingly, if the fixed object information is not referenced, it may not be possible to assume the existence of an object that has a relatively weak reflective wave intensity, and to detect the crossing gate O2 as an obstacle.

However, if the fixed object information is referenced, as illustrated in FIG. 20(*c*), it is possible to assume that an object having a relatively weak reflective wave intensity exists at the position of the crossing gate O2. Accordingly, it is possible to detect the crossing gate O2 as an object by comparing the detected position of the reflective wave with the position in which the object is assumed to exist, and determining the reflective wave intensity. For this reason, it is possible to properly recognize the crossing gate O2 as an obstacle.

As described above, the driving assist device 70 according to the second modification example can properly recognize an obstacle having a relatively weak reflective wave intensity by taking account of the intensity of a reflective wave from the object. That is, since the object having reflective wave intensity of greater than the set threshold value (the expected intensity) is recognized as an obstacle, it is possible to properly recognize the obstacle having a relatively weak reflective wave intensity.

Figure 21:
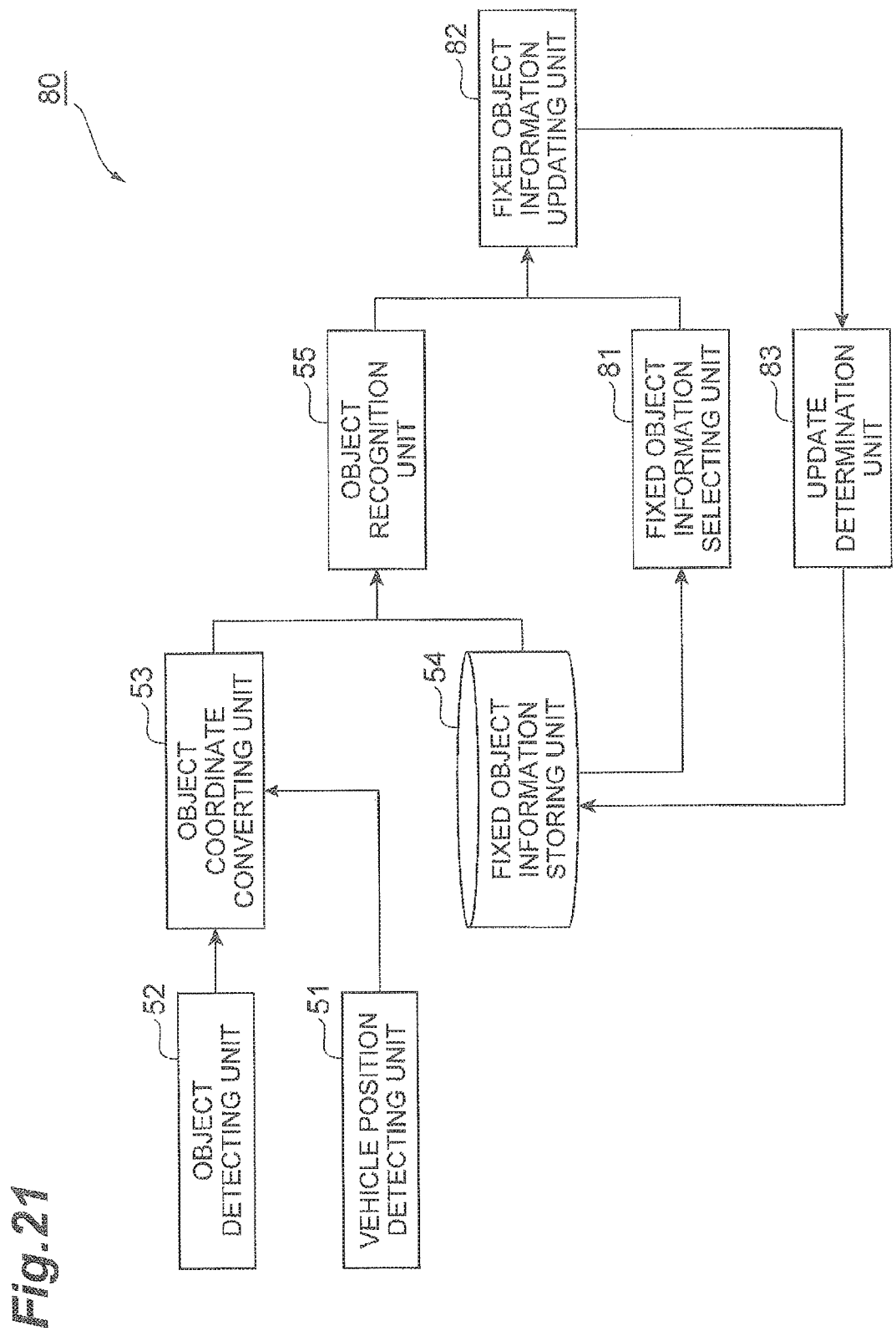
FIG. 21 is a block diagram illustrating the configuration of the driving assist device according to a third modification example.

Subsequently, a driving assist device 80 according to a third modification example of the second embodiment will be described with reference to FIGS. 21 to 22. The driving assist device 80 according to the third modification example updates fixed object information of the fixed object. It is necessary to update the fixed object information when a travelling road is changed, and the vicinity of the travelling road is changed. Hereinafter, compared to the second embodiment, the points of differences will be mainly described based on the assumption that the fixed object information of a non-obstacle is updated.

First, the configuration of the driving assist device 80 according to the third modification example will be described with reference to FIG. 21. FIG. 21 is a block diagram illustrating the configuration of the driving assist device 80 according to the third modification example. As illustrated in FIG. 21, the driving assist device 80 includes a fixed object information selecting unit 81; an update determination unit 82; and a fixed object information updating unit 83, in addition to the vehicle position detecting unit 51; the object detecting unit 52; the object coordinate converting unit 53; the fixed object information storing unit 54 (storage unit); and the object recognition unit 55.

The respective functions of the vehicle position detecting unit 51; the object detecting unit 52; the object coordinate converting unit 53; the fixed object information storing unit 54; and the object recognition unit 55 are the same as those in the second embodiment. An electronic control unit (ECU)

or the like mounted in the vehicle realizes at least a part of the functions of the driving assist device 80, particularly, the function of each of the object coordinate converting unit 53, the fixed object information storing unit 54, the object recognition unit 55, the fixed object information selecting unit 81, the update determination unit 82, and the fixed object information updating unit 83.

The fixed object information selecting unit 81 selects the fixed object information of the object existing within the detection range of the object detecting unit 52 among pieces of the fixed object information stored in the fixed object information storing unit 54. The fixed object information selecting unit 81 converts the detection range into a global coordinate based on the position of the vehicle. The fixed object information selecting unit 81 selects the fixed object information of the object existing within the detection range by comparing the converted detection range with the fixed object information.

The update determination unit 82 determines the necessity of updating the fixed object information by comparing a recognized result of the object recognition unit 55 with a result of a selection of the fixed object information. The recognized result of the object recognition unit 55 contains a position which is a target for recognition, that is, a position in which a non-obstacle is recognized or is not recognized. The result of a selection of the fixed object information contains the position of the non-obstacle when it is assumed that the non-obstacle exists in the detection range.

When the recognized result of the object recognition unit 55 is different from the result of a selection of the fixed object information, the update determination unit 82 determines that it is necessary to update the fixed object information. That is, when the object is not recognized at a position in which a fixed object is assumed to exist, the update determination unit 82 determines that it is necessary to delete old fixed object information. In contrast, when the object is recognized at a position in which the fixed object is not assumed to exist, the update determination unit 82 determines that it is necessary to register new fixed object information.

Here, when the update determination unit 82 accumulates the number of times when it is determined that it is necessary to update the fixed object information, and the number of times exceeds a threshold value, it is preferable that the update determination unit 82 finally determine to update the fixed object information. When it is determined that it is not necessary to update the fixed object information, the update determination unit 82 may reduce the number of times when it is determined that it is necessary to update the fixed object information.

When the update determination unit 82 determines to update the fixed object information, the update determination unit 82 supplies the position of a fixed object indicated by the fixed object information to the fixed object information updating unit 83. Here, when the fixed object information is deleted, the position of the fixed object contained in the old fixed object information is supplied, and when the fixed object information is registered, the position of a new fixed object contained in the recognized result is supplied. The position of the new fixed object is preferably an average value of the positions used in determining to update the fixed object information multiple times.

The update determination unit 82 may accumulate the number of times when the updating is determined, for the position of each of the fixed objects, and may update the fixed object information by the unit of the position of the fixed object. The update determination unit 82 may accumulate the number of times when the updating is determined, for each section of the travelling road, and may update the fixed object information by the unit of the section of the travelling road, that is, may update the fixed object information with respect to the position of one or more fixed objects associated with the travelling road.

The fixed object information updating unit 83 updates the fixed object information based on the update determination result. The fixed object information updating unit 83 has access to the fixed object information storing unit 54, deletes the fixed object information of an old fixed object which is not recognized, and registers the fixed object information of the new fixed object which is recognized.

Subsequently, the operation of the driving assist device 80 according to the third modification example will be described with reference to FIG. 22. FIG. 22 is a flowchart illustrating the operation of the driving assist device 80 according to the third modification example. The driving assist device 80 repeatedly executes a process illustrated in FIG. 22 at each predetermined interval.

Figure 22:
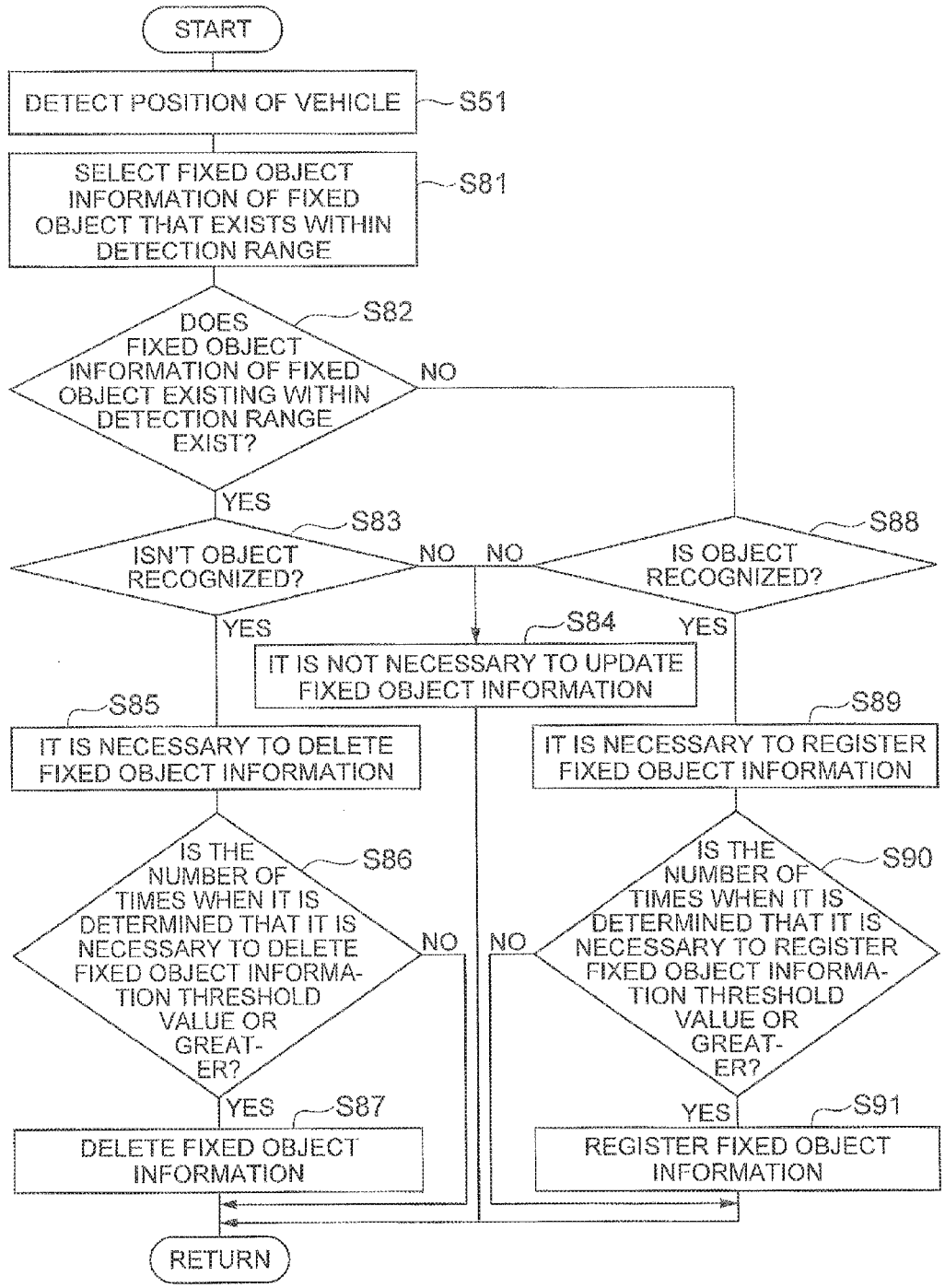
FIG. 22 is a flowchart illustrating the operation of the driving assist device according to the third modification example.

As illustrated in FIG. 22, the vehicle position detecting unit 51 detects the position of the vehicle in the global coordinate system (step S51). The fixed object information selecting unit 81 selects the fixed object information of the fixed object existing within the detection range of the object detecting unit 52 (S81). The update determination unit 82 determines whether the fixed object information of the fixed object exists, in which the fixed object exists in the detection range of the object detecting unit 52 (S82).

When it is determined that the relevant fixed object information exists at step S82, the update determination unit 82 determines whether the object is recognized, based on a recognized result of the object recognition unit 55 (S83). When it is not determined that the object is not recognized, it is considered that the object is recognized at the position in which the fixed object is assumed to exist. Accordingly, the update determination unit 82 determines that it is not necessary to update the fixed object information (S84).

In contrast, when it is determined that the object is not recognized at step S83, it is considered that the object is not recognized at the position in which the fixed object is assumed to exist. Accordingly, the update determination unit 82 determines that it is necessary to delete the fixed object information relating to the position in which the fixed object is assumed to exist (S85). The update determination unit 82 determines whether the number of times when it is necessary to delete the fixed object information relating to the position is a threshold value or greater (S86). When it is determined that the number of times is the threshold value or greater, the fixed object information updating unit 83 deletes the fixed object information (S87).

When it is not determined that the relevant fixed object information exists at step S82, the update determination unit 82 determines whether the object is recognized, based on the recognized result of the object recognition unit 55 (S88). When it is not determined that the object is recognized, it is considered that the object is not recognized at the position in which the fixed object is not assumed to exist. Accordingly, the update determination unit 82 determines that it is not necessary to update the fixed object information (S84).

In contrast, when it is determined that the object is recognized at step S88, it is considered that a new object is recognized at the position in which the fixed object is not assumed to exist. Accordingly, the update determination unit 82 determines that it is necessary to register fixed object information relating to the position in which the new object is recognized (S89). The update determination unit 82 determines whether the number of times when it is necessary to register the fixed object information relating to the position is the threshold value or greater (S90). When it is determined that the number of times is the threshold value or greater, the fixed object information updating unit 83 registers the fixed object information (S91).

In the description above, the fixed object information of a non-obstacle is updated. However, similarly, it is also possible to update the fixed object information of an obstacle. In this case, the driving assist device includes the fixed object information selecting unit that selects the fixed object information of an obstacle which exists within the detection range of the object detecting unit. The update determination unit determines whether it is necessary to update the fixed object information by comparing the result of recognizing the object with the result of a selection of the fixed object information, and determining the reflective wave intensity. The fixed object information updating unit updates the fixed object information that contains the position and reflective wave intensity of an obstacle.

In the description above, the recognized result of the object recognition unit 55 is processed on-line, however, may be processed off-line. In this case, it is preferable that the recognized result of the object recognition unit 55 be stored, and be compared with the fixed object information stored in the fixed object information storing unit 54.

As described above, the driving assist device 80 according to the third modification example can properly update the fixed object information of the fixed object. That is, since the position of the fixed object is updated, it is possible to properly recognize the object based on the latest information.

The above-mentioned embodiments are preferred embodiments of the driving assist device according to the present invention, and the driving assist device according to the present invention is not limited to the above-mentioned embodiments. The driving assist device according to the present invention may be modified or may be applied to other fields insofar as the modifications or the other applications do not depart from the scope of the present invention stated in the claims.

Similarly, according to the above-mentioned methods, the present invention can be applied to a program for properly recognizing the object in the vicinity of the moving body, or a computer readable recording medium storing the program so as to assist the driver in driving the moving body.

For example, in the description above, each of the driving assist devices 10, 20, and 30 includes the object information storing unit 16 or 22, and the three dimensional object information storing unit 17. However, each of the driving assist devices 10, 20, and 30 may be configured to have access to the object information storing unit or the three dimensional object information storing unit which is provided outside thereof. In this case, it is possible to share the object information and the three dimensional object information between a plurality of vehicles. Similarly, in the description above, each of the driving assist devices 50, 60, 70, and 80 may include the fixed object information storing unit 54 or 72. However, each of the driving assist devices 50, 60, 70, and 80 may be configured to have access to the fixed object information storing unit which is provide outside thereof. In this case, it is possible to share the fixed object information between a plurality of vehicles.

REFERENCE SIGNS LIST

10, 20, 30: driving assist device
11: vehicle position detecting unit
12: object detecting unit
13: three dimensional object detecting unit
14: object coordinate converting unit
15: three dimensional object coordinate converting unit
16, 22: object information storing unit
17: three dimensional object information storing unit
18, 23, 33: object recognition unit
21: reflective wave intensity detecting unit
31: object information selecting unit
32: three dimensional object information selecting unit
50, 60, 70, 80: driving assist device
51: vehicle position detecting unit
52: object detecting unit
53: object coordinate converting unit
54, 72: fixed object information storing unit
55, 63, 73: object recognition unit
61: history information generating unit
62: history information storing unit
71: reflective wave intensity detecting unit
81: fixed object information selecting unit
82: update determination unit
83: fixed object information updating unit

The invention claimed is:

1. A driving assist device that recognizes an object in the vicinity of a moving body, and assists a driver in driving the moving body, the driving assist device comprising:
   an object detecting unit that detects the object in the vicinity of the moving body;
   an information generating unit that generates information indicative of a moving history of the detected object;
   a history information storing unit that stores the information generated by the information generating unit as history information;
   an object recognition unit that determines that the detected object is a moving object if the detected object is in motion, and determines that the detected object is a moving object if the detected object is not in motion and has moved previously, based on the history information obtained from the history information storing unit;
   a fixed object information storing unit that stores a position of a non-obstacle as a fixed object information; and
   wherein when the object recognition unit determines a position of the detected object coincides with the position of the non-obstacle, and recognizes the detected object is not the moving object, the object recognition unit recognizes the object as the non-obstacle, and when the object recognition unit determines the position of the detected object coincides with the position of the non-obstacle, and recognizes the detected object is the moving object, the object recognition unit does not recognize the object as the non-obstacle.

2. The driving assist device according to claim 1, wherein the history information storing unit deletes the history information that is not updated during a predetermined period.

* * * * *